United States Patent
Itoh et al.

(10) Patent No.: US 6,362,862 B1
(45) Date of Patent: Mar. 26, 2002

(54) LIQUID CRYSTAL DISPLAY

(75) Inventors: Osamu Itoh; Shinichi Komura; Ikuo Hiyama; Shoichi Hirota; Masaya Adachi, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/840,622

(22) Filed: Apr. 25, 1997

(30) Foreign Application Priority Data

Apr. 26, 1996 (JP) ............................................. 8-107315
Jul. 2, 1996 (JP) ............................................. 8-172049

(51) Int. Cl.[7] ......................................... G02F 1/1335
(52) U.S. Cl. ........................... 349/119; 349/117; 349/5
(58) Field of Search ................................. 349/119, 117, 349/118, 5

(56) References Cited

U.S. PATENT DOCUMENTS

| | | | |
|---|---|---|---|
| 5,150,235 A | * 9/1992 | Haim et al. | 359/68 |
| 5,157,523 A | * 10/1992 | Yamagishi et al. | 349/5 |
| 5,490,006 A | * 2/1996 | Masumoto et al. | 349/119 |
| 5,699,137 A | * 12/1997 | Kishimoto et al. | 349/119 |

FOREIGN PATENT DOCUMENTS

| | | |
|---|---|---|
| EP | 0 544 015 A1 | 6/1993 |
| EP | 0 699 938 A2 | 3/1996 |
| JP | 64-7021 | 1/1989 |
| JP | 3-13916 | 1/1991 |
| JP | 3-263013 | 11/1991 |
| JP | 4-44006 | * 2/1992 |
| JP | 8-36174 | 2/1996 |

* cited by examiner

Primary Examiner—William L. Sikes
Assistant Examiner—Dung Nguyen
(74) Attorney, Agent, or Firm—Antonelli, Terry, Stout & Kraus, LLP

(57) ABSTRACT

A liquid crystal display featuring excellent visibility with both good brightness and a high contrast ratio uses a projection optical system in which a polarizing plate, a first phase plate and a second phase plate in which the retardation of each of the phase plates and a gradient of wavelength dispersion of the retardation can be freely set, a liquid crystal layer, and a reflection plate are arranged in parallel and a transmitted light is reflected by the reflection plate. A gradient of one of the phase plates is set to an extremely steep gradient, a gradient of the other phase plate is set to an extremely flat gradient, and the wavelength dispersion of a retardation composite value obtained from the liquid crystal layer and the two phase plates is approximated to a retardation curve expressed by a relational expression of $(0.25 + 0.5n)\lambda$, where $(n)$ is an integer and $\lambda$ is a wavelength (nm) of the transmitted light.

11 Claims, 17 Drawing Sheets

LIQUID CRYSTAL DISPLAY

BACKGROUND OF THE INVENTION

The present invention relates to a liquid crystal display and an improvement in the contrast of a projection-type liquid crystal display using a reflection-type liquid crystal display element.

A projection-type liquid crystal display of a conventional type produces a display by projecting light onto a screen, so that it needs to produce a brightness sufficient for the display to be recognized under the normal level of illumination light present in a house. In order to enhance the brightness of the display without increasing the power consumption, it is also necessary to increase the aperture ratio. For an increase in the aperture ratio, a reflection-type liquid crystal display element in which the upper part of a TFT (Thin Film Transistor) is covered by a reflection electrode and can be also used for display is suitable. In a conventional projection-type liquid crystal display, a twisted nematic liquid crystal is used for a liquid crystal layer, and two polarizing plates are disposed in front of and behind the liquid crystal layer to produce the display.

However, since the aperture ratio is low, a sufficient brightness to make it possible to recognize the display under the normal level of indoor illumination has not been obtained. Even if a polarization beam splitter is used in place of the polarizing plate, sufficient brightness cannot be obtained. According to Japanese Patent Application Laid-Open No. 64-7021, a reflection plate is disposed between the liquid crystal layer and the lower substrate. The liquid crystal display having such a construction will be referred to herein as a reflection plate type liquid crystal display apparatus.

In the conventional reflection plate type liquid crystal display apparatus, since the wavelength dispersion of a polarization state of light transmitted through the liquid crystal layer is large, the polarization state of the light passing through the liquid crystal layer has to be controlled for the whole visible wavelength in order to obtain a high-contrast display.

However, a method of controlling the wavelength dispersion is not described in Japanese Patent Application Laid-Open No. 64-7021. Since the reflection plate type liquid crystal display has a high aperture ratio for the reason mentioned above, it has the potential ability to obtain a brightness which is sufficient to allow one to easily recognize the display under the normal level of indoor illumination. Consequently, there has been a desire to obtain sufficient brightness and contrast ratio at the same time.

SUMMARY OF THE INVENTION

It is, therefore, an object of the invention to provide a liquid crystal display having excellent visibility in which a sufficient brightness and contrast ratio are provided at the same time.

A liquid crystal display achieving the above object and having a projection optical system in which a polarizing plate, a phase plate, a liquid crystal layer, and a reflection plate are arranged in parallel and a transmitted light is reflected by the reflection plate is characterized in that the phase plate comprises first and second phase plates in which a retardation of each of the phase plates and a gradient of wavelength dispersion of the retardation can be freely set, and the gradient of the first phase plate is set so as to be larger than the gradient of the liquid crystal layer and the gradient of the second phase plate is set so as to be smaller than the gradient of the liquid crystal layer, and wavelength dispersion of a retardation composite value in the projection optical system, which is a combination of the liquid crystal layer and the first and second phase plates, is brought asymptotically closer to a retardation curve expressed by the relational expression $(0.25+0.5n)\lambda$.

According to another aspect of the invention, there is provided a liquid crystal display in which a polarizing plate, first and second phase plates, an upper substrate, a liquid crystal layer, a drive device, and a lower substrate also serving as a reflection plate are sequentially laminated in a travelling direction of transmitted light, and an absorption axis direction of the polarizing plate and an orientation direction of the liquid crystal layer, which is on the side adjacent to the polarizing plate have a non-parallel relation, wherein each of the first and second phase plates, respectively, has a wavelength dispersion of a retardation such that a wavelength dispersion of a retardation composite value of the phase plates and the liquid crystal layer in a range from 400 (nm) to 700 (nm) of a wavelength of the transmitted light is substantially approximated to a retardation curve expressed by the relational expression $(0.25+0.5n)\lambda$.

Further, according to still another aspect of the invention, there is provided a liquid crystal display in which a polarizing means, first and second phase plates, an upper substrate, a liquid crystal layer, a drive device, and a lower substrate also serving as a reflection plate are sequentially laminated in a travelling direction of transmitted light, and an absorption axis direction of the polarizing means and an orientation direction on the side adjacent to the polarizing means of the liquid crystal layer have a non-parallel relation, wherein the polarizing means is a polarizing plate of a type in which a vibration direction of a transmission polarization component of the polarizing means rotates by 90° when the passing direction of the transmitted light is changed, and each of the first and second phase plates has a wavelength dispersion of a retardation, such that a wavelength dispersion of a retardation composite value of the phase plates and the liquid crystal layer in a range from 400 (nm) to 700 (nm) of a wavelength of the transmitted light is set so as to be substantially approximated to a retardation curve expressed by the relational expression $(0.5n)\lambda$, where n is an integer and $\lambda$ is a wavelength (nm) of the transmitted light.

BRIEF DESCRIPTION OF THE DRAWINGS

These and other objects, features and advantages of the present invention will be understood more clearly from the following detailed description, when taken with reference to the accompanying drawings, wherein.

PREFERRED EMBODIMENTS OF THE INVENTION

Embodiments of the invention will be described hereinbelow with reference to the drawings.

Figure 1:
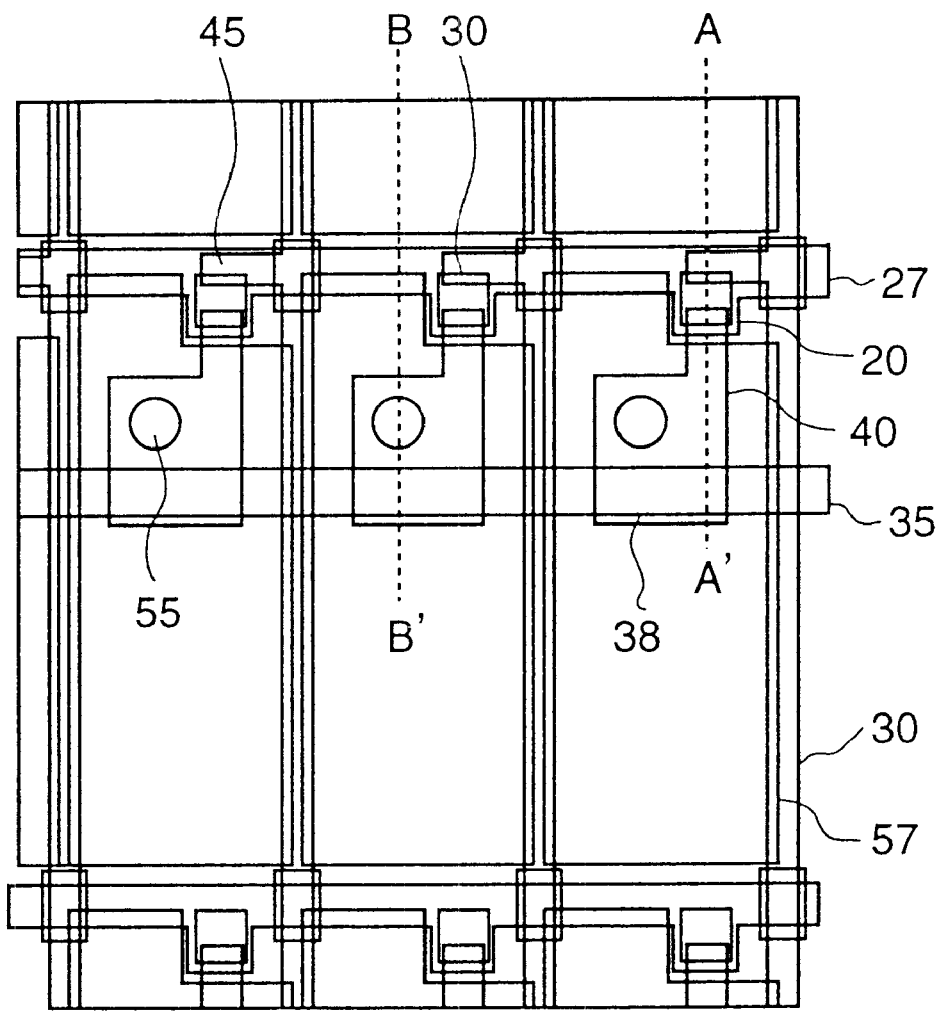
FIG. 1 is a schematic diagram showing a pixel construction of a liquid crystal display forming an embodiment according to the invention.

FIG. 1 is a diagram showing a pixel construction of a liquid crystal display of an embodiment according to the invention. An example of a cross section of a reflection plate type liquid crystal display element according to the invention is illustrated. A polarizing plate is used as polarizing means for changing light from a light source from natural light to polarized light.

There is a TFT on the lower substrate, which is connected to a pixel electrode also serving as a reflection plate on the same lower substrate. The liquid crystal layer is made of a nematic liquid crystal, the orientation direction of the liquid crystal layer near the upper substrate and that near the lower substrate being the same, and the twist angle is 0°. Phase plates 1 and 2 (PH1 and PH2 in FIGS. 7 and 8) and a polarizing plate are laminated on the upper substrate.

Figure 2:
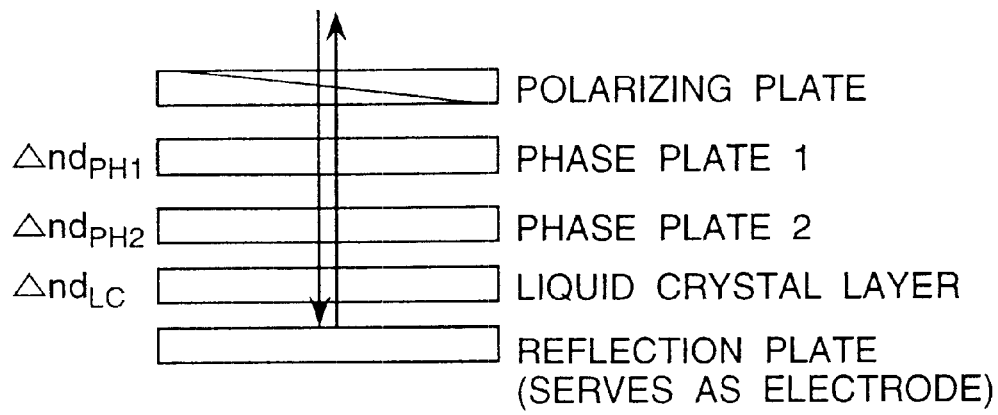
FIG. 2 is a diagram showing component elements relating to a polarization state of transmitted light in the liquid crystal display of FIG. 1.

FIG. 2 is a diagram showing component elements regarding the polarization state of transmission light in the liquid crystal display of FIG. 1. That is, component elements relating to the polarization state of the light are extracted from FIG. 1, and are shown in a simplified diagram.

In FIG. 2, the polarizing plate, phase plates 1 and 2, liquid crystal layer, and a reflection plate are related to the polarization state of the light. Delay axes of the phase plates 1 and 2 are in parallel to or perpendicularly cross an orientation direction of the liquid crystal layer. The angle between an absorption axis (or transmission axis) of the polarizing plate and the delay axis of the phase plate or the orientation direction of the liquid crystal layer is set to 45°. Retardations at a wavelength $\lambda$ of the phase plates 1 and 2 and the liquid crystal layer are expressed as $\Delta nd_{PH1}(\lambda)$, $\Delta nd_{PH2}(\lambda)$, and $\Delta nd_{LC}(\lambda)$, respectively, in FIG. 2.

In FIG. 2, a light passes through the liquid crystal display element sequentially from the polarizing plate, the phase plate 1, the phase plate 2, and the liquid crystal layer and is reflected by the reflection plate. Then, the light passes through the liquid crystal layer, phase plate 2, phase plate 1, and polarizing plate in the opposite order and reaches the user. A change in the polarization state of the light in this step can be replaced by a change in the polarization state in the optical system of FIG. 3 on the assumption that they are equivalent.

Figure 3:
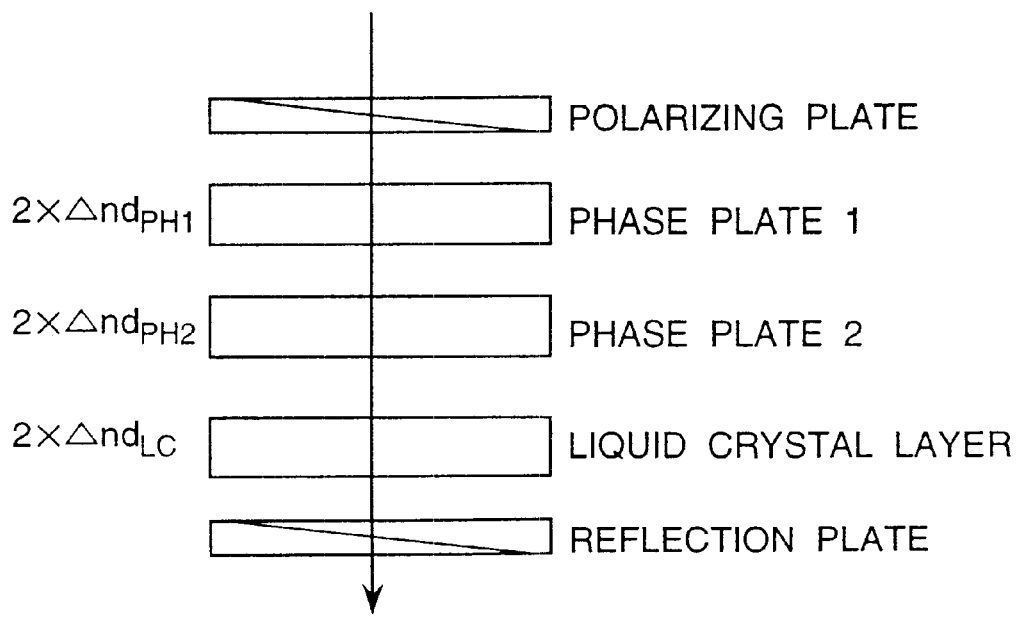
FIG. 3 is a diagram showing an optical system optically equivalent FIG. 2.

FIG. 3 is a diagram showing the optical system which is optically equivalent to the arrangement of FIG. 2. That is, the transmission axes of the polarizing plates 1 and 2 are in parallel, and a retardation of each of the liquid crystal layer, phase plate 1, and phase plate 2 is twice as much as that in FIG. 2.

Conditions to improve the contrast of the reflection plate type liquid crystal display element, that is, conditions to reduce reflectance at the time of dark display may be studied by using the optical system of FIG. 3. The reflectance $R(\lambda)$ of the light at the wavelength $\lambda$ in the optical system of FIG. 3 is expressed by the the following equation.

$$R(\lambda)=0.5(1+\cos(4\pi \Delta nd''(\lambda)/\lambda)) \qquad (1)$$

where, $\Delta nd''(\lambda)$ is a composite value of retardations of the liquid crystal layer, phase plate 1, and phase plate 2, which will be described hereinafter.

In order to reduce the reflectance of the dark display, it is sufficient that $R(\lambda)$ approaches zero over almost the whole range of the visible wavelength, that is, from 400 nm to 700 nm. That is, in a range from 400 nm to 700 nm of the visible wavelength, when a voltage applied to the liquid crystal layer at the time of the dark display is set to $V_B$, it is sufficient that a retardation composite value $\Delta nd''(\lambda)$ obtained by combining the retardations of the liquid crystal layer, phase plate 1, and phase plate 2, when $V_B$ is applied, substantially satisfies $\Delta nd'(\lambda)$ of the following equation; namely, it can be said that when the second term of the equation 1 is almost equal to (-1), $R(\lambda)$ approaches zero.

$$\Delta nd'(\lambda)=(0.25+0.5n)\lambda \qquad (2)$$

where, n is an integer.

Equation 2 shows a wavelength dispersion characteristics curve (hereinbelow, also abbreviated to wavelength dispersion) in which the retardation increases in proportion to the wavelength when n is 0 or larger. In the case where n is smaller than 0, wavelength dispersion in which the retardation decreases in proportion to the wavelength is shown. All of the retardations of transparent birefringence media (e.g., the phase plate, liquid crystal layer, and the like) which have been known until now are positive and show wavelength dispersion in which the retardation decreases as the wavelength increases.

Retardation satisfying the equation 2 using a combination of the liquid crystal layer and the phase plate is therefore attempted. When transparent birefringence media 1 and 2 whose retardations at the wavelength $\lambda$ are $\Delta nd_1(\lambda)$ and $\Delta nd_2(\lambda)$, respectively, ($\Delta nd_1(\lambda)>\Delta nd_1(\lambda)$) are laminated so that the delay axes are in parallel, a retardation composite value $\Delta nd''(\lambda)$ of the two transparent birefringence media is obtained by the following equation.

$$\Delta nd''(\lambda)=\Delta nd_1(\lambda)+\Delta nd_2(\lambda) \qquad (3)$$

When they are laminated so that the delay axes perpendicularly cross each other, $\Delta nd''(\lambda)$ is obtained by the following equation.

$$\Delta nd''(\lambda)=\Delta nd_1(\lambda)-\Delta nd_1(\lambda) \qquad (4)$$

When the wavelength dispersion of the retardation of the transparent birefringence medium 1 is different from that of the medium 2, the wavelength dispersion of the retardation composite value $\Delta nd''(\lambda)$ is different from those of both of the transparent birefringence media 1 and 2.

In other words, the wavelength dispersion of the retardation composite value can be controlled by properly combining the retardations of the transparent birefringence media 1 and 2, the gradients of the wavelength dispersion of the retardations, and the laminating methods (laminating methods of setting the delay axes in parallel or to cross perpendicularly).

By using such a composite value of the retardations, the wavelength dispersion of the retardation composite value $\Delta nd''(\lambda)$ can be made close to the equation 2.

Especially, in order to realize the wavelength dispersion of the retardation as specified in equation 2, with respect to the gradients of the wavelength dispersion of the retardations of the transparent birefringence media 1 and 2, one gradient has to be made extremely steep and the other gradient has to be made extremely flat, and/or the retardations of the transparent birefringence media 1 and 2 have to be increased.

Meanwhile, when only one phase plate is used, one of the transparent birefringence media serves as a liquid crystal layer and the other serves as a phase plate. However, for the purpose of maintaining display characteristics, the gradient of the wavelength dispersion of the retardation of the liquid crystal layer cannot be extremely steep nor flat. Also, the retardation of the liquid crystal layer cannot be increased. Therefore, in the case of using only one phase plate, the gradient of the wavelength dispersion of the retardation of the phase plate can be set either larger or smaller than that of the liquid crystal layer. Consequently, it can be said that the wavelength dispersion of the retardation composite value cannot be brought sufficiently close to equation 2.

On the contrary, according to the invention, since two phase plates are used, the gradient of the phase plate 1 is set larger (steeper) than the gradient of the liquid crystal layer and the gradient of the phase plate 2 is set smaller (flatter) than the gradient of the liquid crystal layer, thereby enabling the wavelength dispersion of the retardation composite value in the projection optical system in which the liquid crystal layer and the two phase plates are incorporated to be brought extremely close to the retardation curve expressed by the relational expression of $(0.25+0.5n)\lambda$ of equation 2. In other words, as mentioned above, with respect to the gradients of the wavelength dispersion of the retardations of the phase plates 1 and 2 serving as transparent birefringence media 1 and 2, one gradient has to be set extremely larger (steeper) than that of the liquid crystal layer and the other gradient has to be set extremely flatter (smaller) than that of the liquid crystal layer.

The above will be described by using FIGS. 4 and 5.

Figure 4:
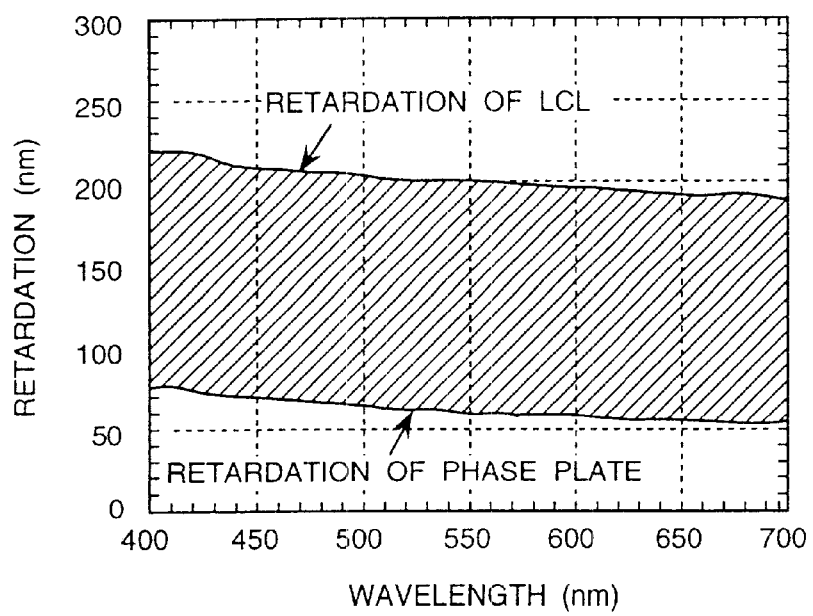
FIG. 4 is a diagram for explaining a composition of retardations in case of using two transparent birefringence media.

FIG. 4 is a diagram showing the composition of the retardation value in case of using the two transparent birefringence media. FIG. 5 is a diagram illustrating the wavelength dispersion of the retardation composite value in case of FIG. 4 and a ¼ wavelength retardation curve by comparison. An example is shown in which the wavelength dispersion of the retardation composite value between the liquid crystal layer and one phase plate, as two transparent birefringence media of the conventional technique, is compared with retardation curve of the ¼ wavelength.

Specifically speaking, polysulfone in which the gradient of the wavelength dispersion of the retardation is the steepest is used for the phase plate. A retardation value at the wavelength 550 (nm) of the liquid crystal layer at the time of the dark display is set to 200 nm and a retardation at the wavelength 550 (nm) of the phase plate is set to 62.5 nm. The phase plate is set so that its delay axis perpendicularly crosses the liquid crystal orientation direction. In this instance, the retardation composite values are shown by the hatched portion in FIG. 4. This is rewritten as FIG. 5.

Figure 5:
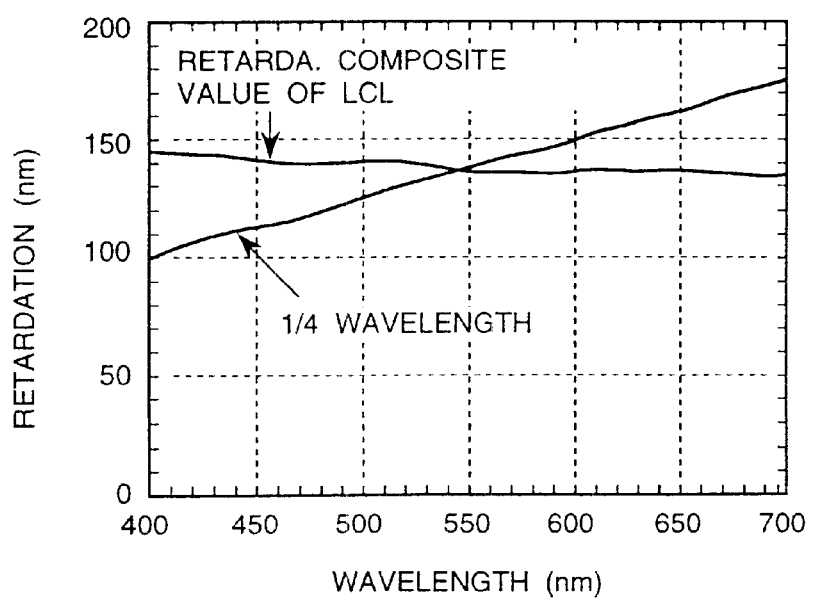
FIG. 5 is a diagram for explaining a wavelength dispersion of a retardation composite value in the case of FIG. 4 and a retardation curve of a ¼ wavelength by comparison.

In FIG. 5, for comparison, wavelength dispersion of the retardation when (n=0) in equation 2, namely, a retardation curve of the ¼ wavelength in which R(λ) is equal to 0 in equation 1 is also shown.

As is obvious from FIG. 5, when only one phase plate is used, the wavelength dispersion of the retardation composite value is not sufficiently close to equation 2.

On the contrary, the invention is characterized in that two phase plates are used so as to bring the wavelength dispersion of the retardation composite value close to equation 2. That is, one phase plate is added in place of the liquid crystal layer, in which the retardation and the gradient of the wavelength dispersion of the retardation cannot be freely changed, and two phase plates in which the retardation and the gradient can be changed are used, thereby enabling a wide range adjustment. The wavelength dispersion of the retardation composite value of the three is brought close to the retardation curve of the ¼ wavelength. It can be said that the above is equivalent to a case where the number of parameters which provide for adjustment is increased from one to two.

In other words, the liquid crystal display according to the invention comprises the liquid crystal layer, drive device, polarizing plate, two phase plates, and upper and lower transparent substrates. Each of the two substrates has a display electrode and an orientation film. The display electrode on the lower substrate also serves as a reflection plate. The display electrode on the lower substrate is connected to an active element as a drive device. The two substrates are arranged so as to face each other by interposing the liquid crystal layer therebetween. The polarizing plate is arranged on the upper substrate. The two phase plates are arranged between the polarizing plate and the upper substrate. The absorption axis direction of the polarizing plate and the orientation direction of the liquid crystal layer near the upper substrate are not in parallel. When the two phase plates are provided as phase plates 1 and 2, n is an integer, and λ is the wavelength of light, and when an optional voltage $V_B$ is applied to the liquid crystal layer by using the drive device, the wavelength dispersion of the retardation composite value of the phase plate 1, phase plate 2, and liquid crystal layer is substantially approximated to the retardation curve expressed by the relational expression (0.25+0.5n)λ in a range from 400 nm to 700 nm of the visible wavelength.

When the retardation of the liquid crystal is set to $\Delta nd_{LC}(\lambda)$, the two phase plates are provided as the phase plates 1 and 2, the retardations of the phase plates 1 and 2 are set to $\Delta nd_{PH1}(\lambda)$ and $\Delta nd_{PH2}(\lambda)$, the retardation composite value $\Delta nd(\lambda)''$ of the liquid crystal layer and the phase plates 1 and 2 is expressed by the following equation.

$$\Delta nd''(\lambda) = \Delta nd_{LC}(\lambda) \pm \Delta nd_{PH1}(\lambda) \pm \Delta nd_{PH2}(\lambda) \tag{5}$$

where, the double sign (± sign) is not sequential.

In equation 5, the signs in the second and third terms are + when the delay axes of the phase plates 1 and 2 are in parallel with the orientation direction of the liquid crystal layer and the sign becomes − when the delay axes perpendicularly cross the orientation direction of the liquid crystal layer. An example of the wavelength dispersion of each of the retardations when the liquid crystal layer and two phase plates are used will now be described.

Figure 9:
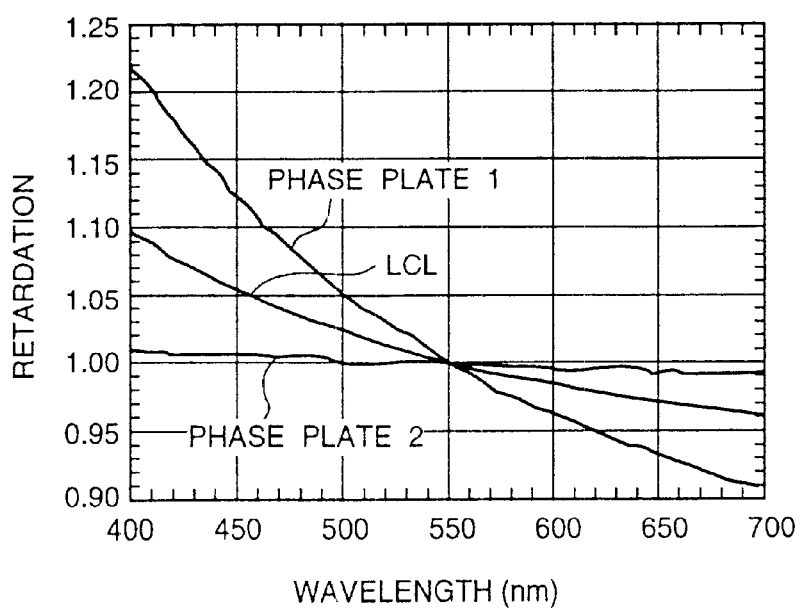
FIG. 9 is a diagram showing wavelength dispersion of each of the retardations of first and second phase plates and a liquid crystal layer in an embodiment of the invention.

FIG. 9 is a diagram showing the wavelength dispersion of each of the retardations of the phase plates 1 and 2 and the liquid crystal layer of the embodiment according to the invention. As the phase plates 1 and 2, a phase plate made of polysulfone and a phase plate made of polyvinyl alcohol are used. The retardations of the phase plates at the wavelength 550 (nm) are set to 331 nm and 408 nm, respectively. The phase plate 1 is arranged so that the delay axis perpendicularly crosses the liquid crystal orientation direction. The phase plate 2 is arranged so that the delay axis is in parallel with the liquid crystal orientation direction. The retardation at the wavelength 550 (nm) of the liquid crystal layer is set to 60 nm. The results are shown in FIG. 10.

Figure 10:
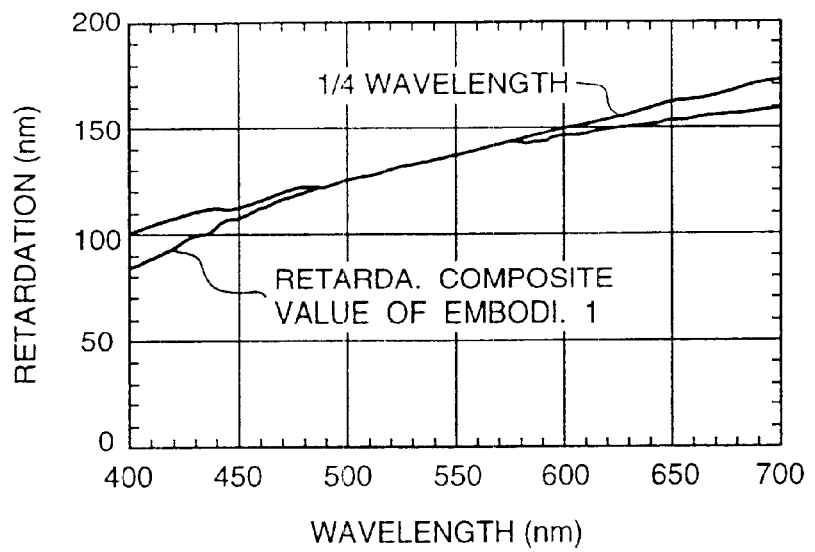
FIG. 10 is a diagram showing wavelength dispersion of a retardation composite value of the first and second phase plates and the liquid crystal panel at the time of the dark display in FIG. 9 and a retardation curve of the ¼ wavelength.

FIG. 10 is a diagram showing wavelength dispersion of a retardation composite value of the phase plates 1 and 2 and the liquid crystal layer at the time of the dark display in FIG. 9 and a retardation curve of ¼ wavelength. As shown in FIG. 10, the wavelength dispersion (characteristics curve) of the retardation composite value increases with the wavelength in a manner similar to equation 2 and coincides with the retardation curve of ¼ wavelength at the wavelength 550 nm. The wavelength dispersion is an extremely close line which is almost approximated to the retardation curve of ¼ wavelength in the visible wavelength range (range from 400 nm to 700 nm).

There are only two settings of the delay axis of the phase plate, that is, the delay axis may be set in parallel with or perpendicularly cross the orientation direction of the liquid crystal layer. Therefore, when three or more phase plates are used, the delay axes of at least two of them are in parallel and the two phase plates whose delay axes are in parallel can be replaced by one phase plate. Therefore, even if three or more phase plates are used, there is not much difference in the substantial effects from the case in which two phase plates are used. The retardation composite value is not approximated to equation 2 more than that shown in FIG. 10. In consideration of the increase in cost, the optimum number of phase plates is two.

When a polarization beam splitter is used as polarizing means, equation 1 and equation 2 are replaced by equation 6 and equation 7, respectively.

$$R(\lambda) = 0.5(1 - \cos(4\pi \Delta nd''(\lambda)/(\lambda))) \tag{6}$$

$$\Delta nd'(\lambda) = 0.5n\lambda \tag{7}$$

This is because the vibration direction of a transmission polarization component is rotated by 900 in the polarization beam splitter when the travelling direction of the light is changed. The foregoing argument is similarly satisfied in this case as well. The optimum number of the phase plates is two in order to improve the contrast ratio.

When the retardation of the liquid crystal layer at the time of the dark display is sufficiently small, the change in the contrast ratio in association with a temperature change is also small. For example, when the retardation of the liquid crystal layer is changed by 5% due to a temperature change, if the retardation of the liquid crystal layer is 200 nm, the amount of change in the retardation is 10 nm. When the retardation of the liquid crystal layer is 40 nm, the amount of change in the retardation is only 2 nm.

That is, it is set so that a dark display is produced when the retardation of the liquid crystal layer is low, thereby suppressing the change in retardation of the liquid crystal layer due to the temperature change. Consequently, the deterioration in the contrast ratio due to a temperature change can be suppressed. In other words, it can be said that reduction in retardation at the wavelength 550 (nm) of the liquid crystal layer at the time of the dark display is a necessary requirement to avoid a deterioration in contrast ratio due to a temperature change.

It has been determined that, when the dark display is performed, if the retardation of the liquid crystal layer is a sufficiently and properly low value, for example, 40 (nm), as will be described later by tables 1 and 2, the retardation at the wavelength 550 (nm) of the phase plate 2 becomes larger than the retardation at the wavelength 550 (nm) of the phase plate 1. In other words, when the retardation at the wavelength 550 (nm) of the phase plate 2 is set so as to be larger than the retardation at the wavelength 550 (nm) of the phase plate 1, it can be said that the retardation at the wavelength 550 (nm) of the liquid crystal layer is a low value effective to solve the problems.

Figure 6:
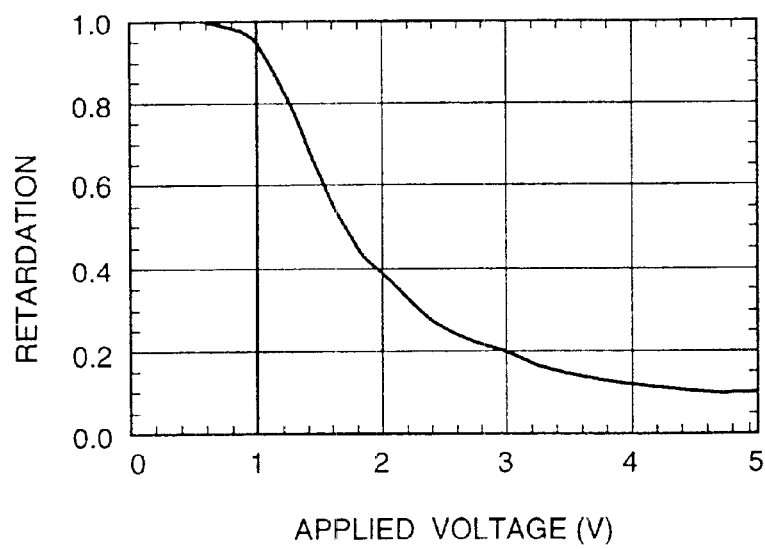
FIG. 6 is a diagram showing applied voltage dependency of retardation of a liquid crystal layer in an embodiment according to he invention.

FIG. 6 is a diagram showing the dependence of the retardation of the liquid crystal layer of the embodiment according to the invention on the applied voltage. As shown in the diagram, the retardation of the liquid crystal layer is changed by the applied voltage. The axis of ordinate of FIG. 6 shows the retardations of the liquid crystal layer obtained by dividing retardations by a value at the applied voltage 0V. The retardation of the liquid crystal layer sharply decreases from 1V to 2V. Therefore, when the dark display is performed on the higher voltage side than 2V, the display at a high contrast ratio can be obtained without being influenced by the temperature.

Specific contents and effects of the invention will be described hereinbelow by reference to various embodiments.

EMBODIMENT 1

Figure 7:
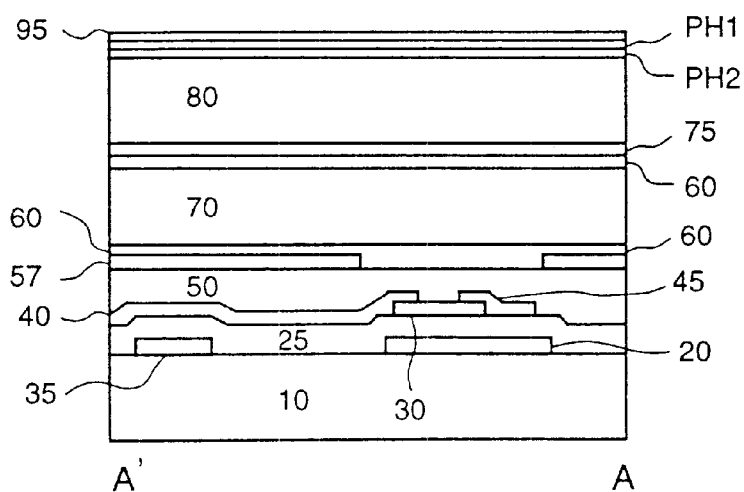
FIG. 7 is a cross section showing the pixel construction taken on line A–A' of the liquid crystal display of FIG. 1.
Figure 8:
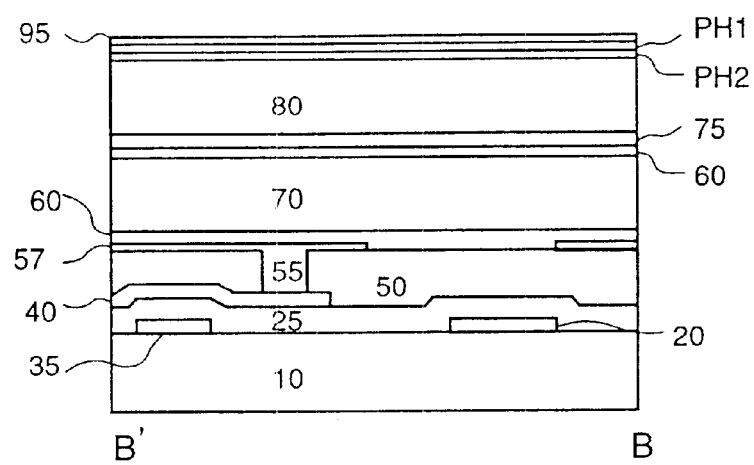
FIG. 8 is a cross section showing the pixel construction taken on line B–B' of the liquid crystal display of FIG. 1.

FIG. 1 is a plan view showing an example of the construction of one pixel of a liquid crystal display according to embodiment 1 and its periphery. FIG. 7 is a cross section showing the pixel construction taken on line A–A' of the liquid crystal display of FIG. 1. FIG. 8 is a cross section showing the pixel construction taken on line B–B' of the liquid crystal display of FIG. 1. The construction of the liquid crystal display according to the embodiment 1 will be described.

A lower substrate 10 is made of no-alkali boro-silicate glass and has silicon oxide layers on and under the substrate. A gate electrode 20 is made of an aluminum film formed by sputtering and has an anodic aluminum oxide film thereon. An insulating film 25 is a silicon nitride film having a film thickness of 2000 Å and is formed by a plasma CVD method. A TFT operates so that the channel resistance is reduced by a positive bias application to the gate electrode and the channel resistance is increased by zero bias. The TFT is formed by the gate electrode 20, insulating film 25 and an i-type semiconductor layer 30.

The i-type semiconductor layer is made of an amorphous silicon and has a film thickness of 2000 Å. Phosphorus is doped on a portion in which its source electrode and drain electrode are overlapped, thereby forming an N(+)-type amorphous silicon semiconductor layer. Each of a source electrode 40 and a drain electrode 45 is formed of two layers. The upper layer is made of aluminum having a film thickness of 3000Å formed by sputtering and the lower layer is made of chrome having a film thickness of 600Å similarly formed by sputtering. A planarization film 50 on the TFT is a silicon nitride film having a film thickness of 1 μm formed by a plasma CVD system.

A pixel electrode 57 on the planarization film is made of aluminum and is connected to the source electrode by a through hole 55. A polyimide organic high polymer is used for an organic orientation film 60. HA-5073XX supplied from Chisso K. K. is used for a liquid crystal layer 70. The maximum of the thickness of the liquid crystal layer in the pixel electrode is set to 3.0 μm and the retardation of the liquid crystal layer when no voltage is applied is set to 0.25 μm.

The organic orientation film 60 on the upper substrate 80 is the same as that of the lower substrate. The orientation processing directions of the organic orientation films on the upper and lower substrates are not parallel and the pre-tilt angle is 5°. A common transparent pixel electrode 75 of the upper substrate is made of an Indium-Tin-Oxide (ITO) film formed by sputtering and the film thickness is 1400Å. The upper substrate 80 is made of no-alkali boro-silicate glass, which is the same as the lower substrate, and silicon oxide layers are provided on and under the upper substrate.

A phase plate made of polysulfone and a phase plate made of polyvinyl alcohol are used for a phase plate 1 PH1 and a phase plate 2 PH2. The wavelength dispersion of each of the retardations of the phase plates 1 and 2 and the liquid crystal layer are shown in FIG. 9.

FIG. 9 is a diagram showing the wavelength dispersion of each of the retardations of the phase plates 1 and 2 and the liquid crystal layer. The axis of ordinate of FIG. 9 is the retardation expressed in a ratio obtained by dividing the retardation by a value at the wavelength 550 nm.

The retardations of the phase plates 1 and 2 are determined by using a least square so that a dark display is obtained at the applied voltage 3.0V when the retardation of the liquid crystal layer becomes a small value. The method will be described hereinbelow.

Equation 8 is the square of the difference between the wavelength dispersion of the equation 2 and the retardation composition value of the liquid crystal layer, phase plate 1, and phase plate 2 at each wavelength and shows a deviation between the wavelength dispersion of the retardation composite value and the equation 2.

$$\Sigma\{\Delta nd''(\lambda) - \Delta nd''(\lambda)\}^2 = S \tag{8}$$

$\Delta nd''(\lambda)$ in equation 8 denotes the retardation composite value of the liquid crystal layer, phase plate 1, and phase plate 2 in a manner similar to the equation 5. This can be rewritten as equation 9.

$$\Delta nd''(\lambda) = \Delta nd_{LC}(\lambda) + R_{PH1} \times \Delta nd_{PH1}(\lambda)/\Delta nd_{PH1} \ (\lambda=550 \text{ nm}) + R_{PH2} \times \Delta nd_{PH2}(\lambda)/\Delta nd_{PH2} \ (\lambda=550 \text{ nm}) \tag{9}$$

$R_{PH1}$ and $R_{PH2}$ in equation 9 are retardations of the phase plate 1 and phase plate 2 at the wavelength 550 nm. The signs of $R_{PH1}$ and $R_{PH2}$ are related to the direction of the delay axis of the phase plate. The sign is + when the delay axis is in parallel with the orientation direction of the liquid crystal layer and is – when the delay axis perpendicularly crosses the orientation direction of the liquid crystal layer.

In equation 8, the sum of five wavelengths (450 nm, 500 nm, 550 nm, 600 nm, and 650 nm) in the visible wavelength range is obtained. $R_{PH1}$ and $R_{PH2}$ satisfying the following two equations are also obtained.

$$\partial s/\partial R_{PH1} = 0 \tag{10}$$

$$\Delta nd_{LC}(\lambda=550 \text{ nm}) + R_{PH1} + R_{PH1} = 0.25 \times 550 \text{ nm} \tag{11}$$

Finally, $R_{PH1}$ and $R_{PH2}$ satisfying equation 10 and equation 11 minimize S in equation 8 and give the retardation composite value of the phase plate 1, phase plate 2, and liquid crystal layer which satisfies (coincides with) equation 2.

Specifically speaking, the retardation at the wavelength 550 nm of the liquid crystal layer when the applied voltage is 3.0V is 50 (nm). This value and n=0 are substituted ((0.25)λ, that is, ¼ wavelength) and calculations are executed according to the (expression 8) to (expression 11), $R_{PH1}=-331$ nm and $R_{PH2}=408$ nm.

Accordingly, the retardations of the phase plate 1 and phase plate 2 are set to 331 nm and 408 nm, respectively. The phase plate 1 and phase plate 2 are disposed so that the delay axis of one of them perpendicularly crosses the orientation direction of the liquid crystal layer and the other delay axis is in parallel with the orientation direction of the liquid crystal layer. A polarizing plate 95 is arranged so that the angle between its absorption axis and the liquid crystal orientation direction is 45°.

The retardation composite value of the phase plate 1, phase plate 2, and liquid crystal layer at the applied voltage of 3.0V is shown in FIG. 10.

FIG. 10 is a diagram showing the retardation composite value of the phase plates 1 and 2 and the liquid crystal layer at the time of the dark display in the embodiment 1 and also a retardation curve of the ¼ wavelength.

In FIG. 10, the retardation composite value coincides with the ¼ wavelength at the wavelength 550 nm and is close to the retardation curve of the ¼ wavelength in other portions of the visible wavelength range (range from 400 nm to 700 nm). It can be said the retardation composite value is substantially approximated to the retardation curve. "Substantially" means that it is in a range of practical use which can obtain sufficiently preferable visibility even when manufacturing tolerance is included.

Figure 11:
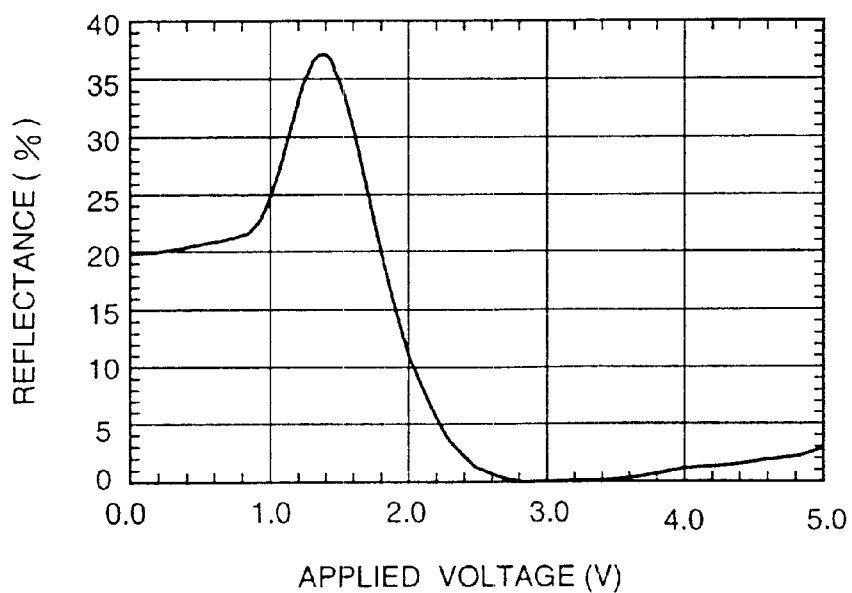
FIG. 11 is a diagram showing applied voltage dependency of reflectance in Embodiment 1.

Results when a drive device is incorporated in the liquid crystal display of the embodiment 1 and the applied voltage dependency of the reflectance is measured at 20° C. are shown in FIG. 11.

FIG. 11 is a diagram showing the applied voltage dependency of reflectance in the embodiment 1.

The reflectance is 0.15% when the applied voltage is 3.0V, and the contrast ratio is 100:1 or higher. A conventional contrast ratio is 28:1.

In the above embodiment 1, the phase plates 1 and 2 having different wavelength dispersion of the retardations are used and the composite value of the retardations of the phase plates 1 and 2 and the liquid crystal layer is brought sufficiently close to the ¼ wavelength in the whole visible wavelength, the display of the high contrast ratio can be obtained.

EMBODIMENT 2

According to the embodiment 2, in a liquid crystal display which is the same as that of the embodiment 1, the retardation at the wavelength 550 (nm) of the liquid crystal layer is set to 200 nm and the retardations at the wavelength 550 (nm) of the phase plates 1 and 2 are set to 322 nm and 420 nm, respectively. The retardation composite value of the phase plates 1 and 2 and the liquid crystal layer when the applied voltage is 3.0V is shown in FIG. 12.

Figure 12:
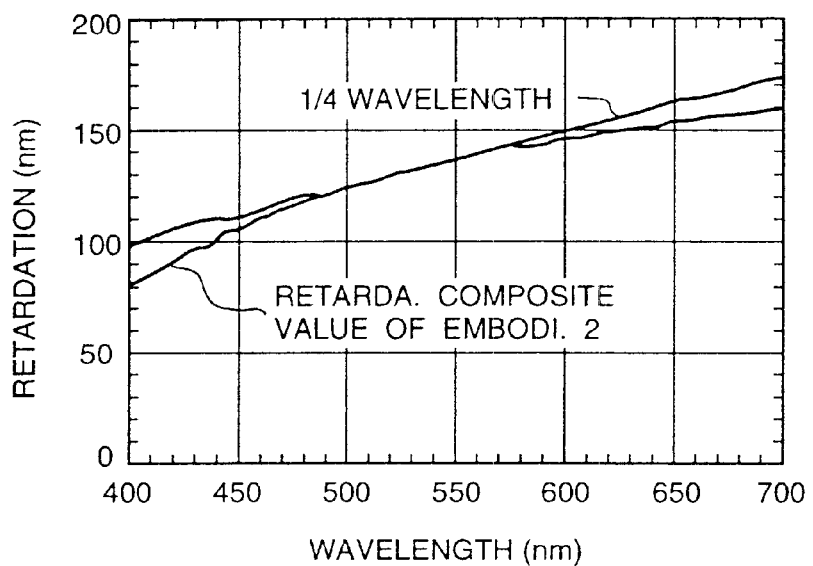
FIG. 12 is a diagram showing wavelength dispersion of the retardation composite value of the first and second phase plates and the liquid crystal layer at the time of the dark display in Embodiment 2 and a retardation curve of the ¼ wavelength.

FIG. 12 is a diagram showing the retardation composite value of the phase plates 1 and 2 and the liquid crystal layer at the time of the dark display in the embodiment 2 and a ¼ wavelength retardation curve.

The composite value is equal to the ¼ wavelength at the wavelength 550 nm and is close to the ¼ wavelength in other portions of the visible wavelength range (400 nm to 700 nm). It is substantially approximated to the ¼ wavelength.

Figure 13:
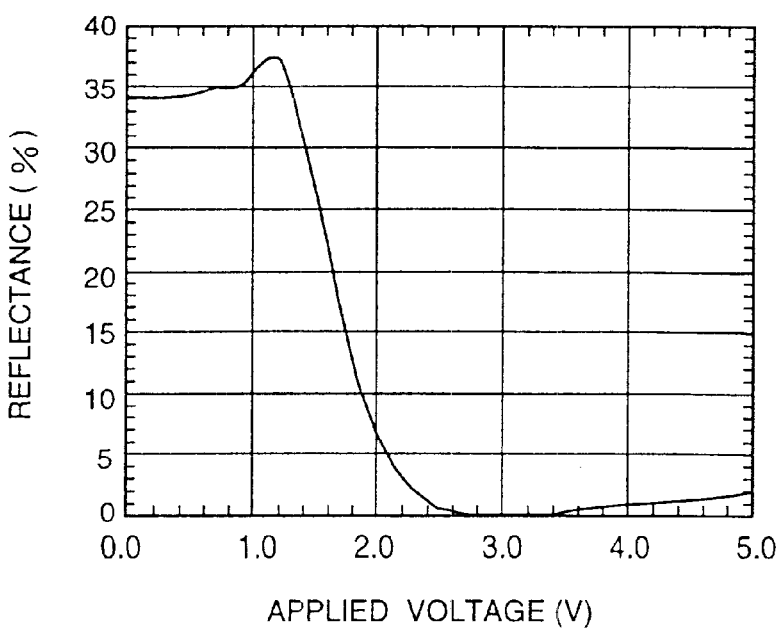
FIG. 13 is a diagram showing applied voltage dependency of reflectance in Embodiment 2.

The drive device is incorporated in the liquid crystal display and results when the applied voltage dependence of the reflectance at 20° C. is measured are shown in FIG. 13.

FIG. 13 is a diagram showing the applied voltage dependency of the reflectance in the embodiment 2.

The reflectance is 0.14% and the contrast ratio is 100:1 when the applied voltage is 3.0V.

As mentioned above, the composite value of the retardations of the phase plates 1 and 2 and the liquid crystal layer is brought sufficiently close to the ¼ wavelength in the whole visible wavelength range by using the phase plates 1 and 2 having different wavelength dispersion of the retardations, thereby obtaining a display having a high contrast ratio.

EMBODIMENT 3

In the liquid crystal display of the embodiment 2, the retardation at the wavelength 550 (nm) of the liquid crystal layer is set to 200 nm and the retardations at the wavelength 550 (nm) of the phase plates 1 and 2 are set to 386 nm and 333 nm, respectively. The composite value of the retardations of the phase plate 1, phase plate 2, and liquid crystal layer when the applied voltage is 1.0V is shown in FIG. 14.

Figure 14:
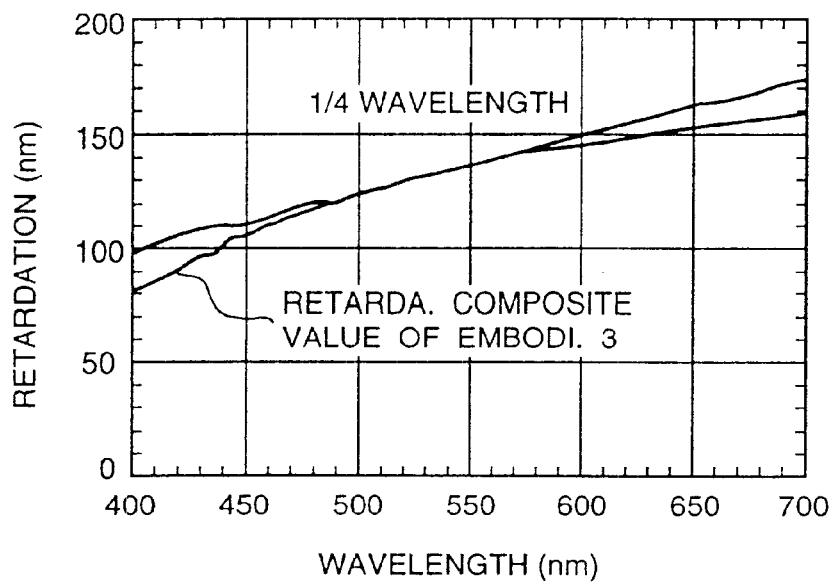
FIG. 14 is a diagram showing wavelength dispersion of the retardation composite value of the first and second phase plates and the liquid crystal layer at the time of the dark display in Embodiment 3 and a retardation curve of the ¼ wavelength.

FIG. 14 is a diagram showing the retardation composite values of the phase plates 1 and 2 and the liquid crystal layer at the time of the dark display in the embodiment 3 and a ¼ wavelength retardation curve.

The composite value is equal to the ¼ wavelength at the wavelength 550 nm and is close to the ¼ wavelength in other portion of the visible wavelength range (range from 400 nm to 700 nm) and is substantially approximated.

Figure 15:
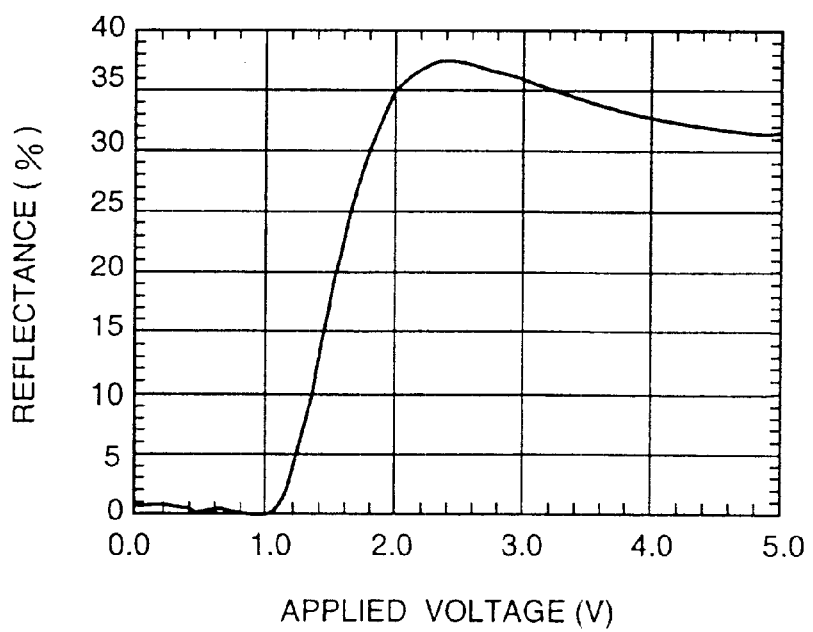
FIG. 15 is a diagram showing applied voltage dependency of reflectance in Embodiment 3.

Results when the drive device is incorporated into the liquid crystal display and the applied voltage dependence of the reflectance at 20° C. is measured are shown in FIG. 15. FIG. 15 is a diagram showing the applied voltage dependency of the reflectance in the embodiment 3. The reflectance is 0.16% and the contrast ratio is 100:1 when the applied voltage is 1.0V.

As mentioned above, the composite value of the retardations of the phase plates 1 and 2 and the liquid crystal layer is brought sufficiently close to the ¼ wavelength in the whole visible wavelength range by using phase plates 1 and 2 having the different wavelength dispersion of retardations, thereby obtaining a display having a high contrast ratio.

In case of the embodiment 3, the retardation at the wavelength 550 (nm) of the phase plate 1 is larger than the retardation at the wavelength 550 (nm) of the phase plate 2. Although the contrast ratio deteriorates due to temperature change as compared with the embodiments 5, 6, 8, and 9, which will be described later, it is on a no-problematic level as compared with the conventional technique.

EMBODIMENT 4

Figure 16:
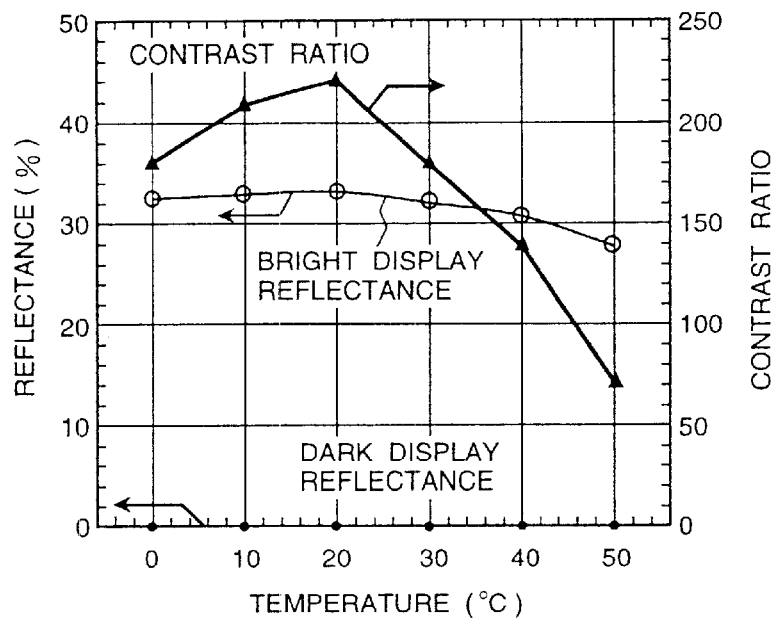
FIG. 16 is a diagram showing temperature dependency of reflectance upon light display, reflectance upon dark display, and contrast ratio in Embodiment 4.

In the liquid crystal display of the embodiment 2, display characteristics are measured by changing the temperature from 0° C. to 50° C. The results are shown in FIG. 16. FIG. 16 is a diagram showing the temperature dependency of reflectance upon the light display, reflectance upon the dark display, and the contrast ratio in the embodiment 4. Although the contrast ratio deteriorates especially on the high temperature side, display at the high contrast ratio of 70:1 or higher can be obtained in the above temperature range.

EMBODIMENT 5

In the liquid crystal display of the embodiment 1, $R_{PH1}$ and $R_{PH2}$ are obtained with respect to the cases where (n) in equation 2 is from 4 to 0. The results are shown in Table 1.

TABLE 1

| n | $R_{PH1}$ | $R_{PH2}$ |
|---|---|---|
| +4 | −2767 nm | +3955 nm |
| +3 | −2157 nm | +3069 nm |
| +2 | −1547 nm | +2184 nm |
| +1 | −937 nm | +1299 nm |
| 0 | −326 nm | +414 nm |
| −1 | +284 nm | −471 nm |
| −2 | +894 nm | −1357 nm |
| −3 | +1504 nm | −2242 nm |
| −4 | +2115 nM | −3127 nm |

In any case, the sign of $P_{Ph1}$ is − and the sign of $R_{PH2}$ is +. The absolute value of $R_{PH2}$ is larger than the absolute value of $R_{PH1}$.

When the liquid crystal display of the invention is designed in such a manner that a phase plate in which the gradient of the wavelength dispersion of the retardation is steeper than that of the liquid crystal layer is used as the phase plate 1, a phase plate in which the gradient of the wavelength dispersion of the retardation is flatter than that of the liquid crystal layer is used as the phase plate 2, and (n) in the equation 2 is 0 or larger, the phase plate 1 is arranged so that the delay axis perpendicularly crosses the orientation direction of the liquid crystal layer and the phase plate 2 is set so that the delay axis is in parallel with the orientation direction of the liquid crystal layer. When the retardation of the phase plate 2 is set so as to be larger than that of the phase plate 1, a display having a high contrast ratio can be obtained.

EMBODIMENT 6

In the liquid crystal display of the embodiment 1, RPH1 and $R_{PH2}$ are obtained with respect to the cases where (n) in equation 2 is from −1 to −4. The results are shown in Table 1.

In any case, the sign of $R_{PH1}$ is + and the sign of $R_{PH2}$ is −. The absolute value of $R_{PH2}$ is larger than the absolute value of $R_{PH1}$.

When the liquid crystal display of the invention is designed in such a manner that a phase plate in which the gradient of the wavelength dispersion of the retardation is steeper than that of the liquid crystal layer is used as the phase plate 1, a phase plate in which the gradient of the wavelength dispersion of the retardation is flatter than that of the liquid crystal layer is used as the phase plate 2, and (n) in the equation 2 is set to −1 or smaller, the phase plate 1 is arranged so that the delay axis is in parallel with the orientation direction of the liquid crystal layer and the phase plate 2 is set so that the delay axis perpendicularly crosses the orientation direction of the liquid crystal layer. When the retardation of the phase plate 2 is set so as to be larger than that of the phase plate 1, a display having a high contrast ratio can be obtained.

EMBODIMENT 7

This relates to a case where the polarizing plate is replaced by a polarization beam splitter in the liquid crystal display of the embodiment 1. That is, it relates to a case which is substantially approximated to the retardation curve expressed by the relational expression of $(0.5n)\lambda$. When $\Delta nd'(\lambda)$ in the equation 8 is set to the wavelength dispersion of the retardation defined by the equation 7 and n=0 (0 wavelength), $R_{PH1}$ and $R_{PH2}$ are obtained. As shown in Table 2, $R_{PH1}$=−21 nm and $R_{PH2}$=−29 nm.

TABLE 1

| n | $R_{PH1}$ | $R_{PH2}$ |
|---|---|---|
| +4 | −2462 nm | +3512 nm |
| +3 | −1852 nm | +2627 nM |
| +2 | −1242 nm | +1742 nm |
| +1 | −631 nm | +856 nm |
| 0 | −21 nm | −29 nm |
| −1 | +589 nm | −914 nm |
| −2 | +1199 nm | −1799 nm |
| −3 | +1810 nm | −2684 nm |
| −4 | +3420 nm | −3570 nm |

Therefore, the retardations at the wavelength 550 (nm) of the phase plates 1 and 2 are set to 21 nm and 29 nm, respectively, a phase plate in which the gradient of the wavelength dispersion of the retardation is steeper than that of the liquid crystal layer is used as the phase plate 1, a phase plate in which the gradient of the wavelength dispersion of the retardation is flatter than that of the liquid crystal layer is used as the phase plate 2, (n) in the equation 7 is set to 0, and the delay axis of each of them is arranged so as to perpendicularly cross the liquid crystal orientation direction.

When the drive device is incorporated in the liquid crystal display and the applied voltage dependency of the reflectance at 20° C. is measured, the reflectance is 0.12% when the applied voltage is 3.0V and the contrast ratio is 100:1 or higher.

As mentioned above, the phase plates 1 and 2 each having a different wavelength dispersion of the retardation are used and the composite value of the retardations of the phase plates 1 and 2 and the liquid crystal layer is brought sufficiently close to the zero wavelength in the whole visible wavelength range, thereby obtaining a display having a high contrast ratio.

EMBODIMENT 8

In the liquid crystal display of the embodiment 7, $R_{PH1}$ and $R_{PH2}$ are obtained with respect to cases where (n) in equation 7 is from 4 to 1. The results are shown in Table 2.

In any case, the sign of $R_{PH1}$ is − and the sign of $R_{PH2}$ is +. The absolute value of $R_{PH2}$ is larger than the absolute value of $R^{PH2}$.

When the liquid crystal display of the invention is designed in such a manner that a phase plate in which the gradient of the wavelength dispersion of the retardation is steeper than that of the liquid crystal layer is used as the phase plate 1, a phase plate in which the gradient of the wavelength dispersion of the retardation is flatter than that of the liquid crystal layer is used as the phase plate 2, and (n) in equation 7 is set to 1 or larger, the phase plate 1 is arranged so that the delay axis perpendicularly crosses the orientation direction of the liquid crystal layer and the phase plate 2 is arranged so that the delay axis is in parallel with the orientation direction of the liquid crystal layer. When the retardation of the phase plate 2 is set so as to be larger than that of the phase plate 1, a display having a high contrast ratio can be obtained.

EMBODIMENT 9

In the liquid crystal display of the embodiment 7, $R_{PH1}$ and $R_{PH2}$ are obtained with respect to cases where (n) in equation 7 is from −1 to −4. The results are shown in Table 2.

In any case, the sign of $R_{PH1}$ is + and the sign of $R_{PH2}$ is The absolute value of $R_{PH2}$ is larger than the absolute value of $R_{PH1}$'

Therefore, when the liquid crystal display of the invention is designed in such a manner that a phase plate in which the gradient of the wavelength dispersion of the retardation is steeper than that of the liquid crystal layer is used as the phase plate 1, a phase plate in which the gradient of the wavelength dispersion of the retardation is flatter than that of the liquid crystal layer is used as the phase plate 2, and (n) in equation 7 is set to −1 or smaller, the phase plate 1 is arranged so that the delay axis is in parallel with the orientation direction of the liquid crystal layer and the phase plate 2 is arranged so that the delay axis perpendicularly crosses the orientation direction of the liquid crystal layer. When the retardation of the phase plate 2 is set so as to be larger than that of the phase plate 1, a display having a high contrast ratio can be obtained.

Example for Comparison

Figure 17:
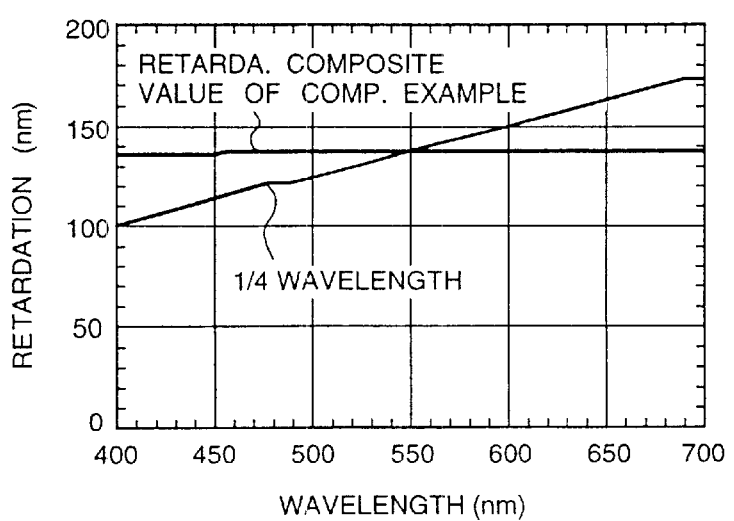
FIG. 17 is a diagram showing wavelength dispersion of the retardation composite value of the first and second phase plates and the liquid crystal layer at the time of the dark display and a retardation curve of the ¼ wavelength in a comparison example.

In the liquid crystal display of the embodiment 2, the phase plate 2 is eliminated and the retardation at the wavelength 550 (nm) of the phase plate 1 is set to 174 nm. A composite value of retardations of the phase plate 1 and the liquid crystal layer when the applied voltage is 3.0V is shown in FIG. 17. The composite value is equal to the ¼ wavelength at the wavelength 550 nm, but is very far from the ¼ wavelength in the other portion of the visible wavelength range.

Figure 18:
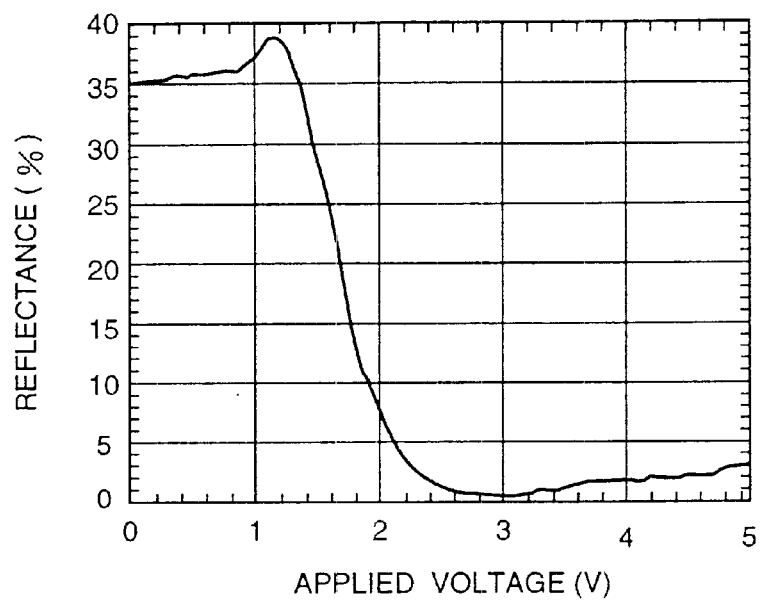
FIG. 18 is a diagram showing applied voltage dependency of reflectance in the comparison example.

The drive device is incorporated in the liquid crystal display and the applied voltage dependency of the reflectance at 20° C. is measured. The results are shown in FIG. 18. The reflectance is 1.05% when the applied voltage is 3.0V and the contrast ratio is 28:1.

As mentioned above, if only one phase plate is used, the composite value of the retardations cannot be brought sufficiently close to the ¼ wavelength in the whole visible wavelength range and a display having a high contrast ratio cannot be obtained.

According to the embodiments of the invention, the composite value of the retardations of the liquid crystal layer and the phase plates 1 and 2 is brought close to the ¼ wavelength for the whole visible wavelength range and a display having a high contrast ratio can be obtained. Consequently, a reflection-type liquid crystal display having a high contrast ratio and high aperture ratio can be obtained.

The liquid crystal layer of the embodiment has a "layer construction having a homogeneous orientation". However, even when using "a layer structure having a twist", similar effects can be obtained by determining the delay axis of the phase plate and the transmission axis of the polarizing plate by using the orientation direction of the liquid crystal layer on the side near the polarizing plate as a reference.

The phase plate and the polarizing plate need not be made of an organic high polymer film. Similar effects can be also obtained by using a phase plate and a polarizing plate made of an inorganic material. Further, similar effects can be also obtained by using a polysilicon TFT or an MOS as the active element.

Now, a liquid crystal display element to be used for a projection-type liquid crystal display, and particularly, a method of controlling retardation wavelength dispersion of a reflection plate built-in type liquid crystal display element using a double refraction mode will be described.

First, a reason why a display is colored at low contrast in a conventional projection-type liquid crystal display will be considered. In the projection-type liquid crystal display, a transmission component (linear polarization) is selected from light source light by using a polarization beam splitter. Reflectance R($\lambda$) of the light having the wavelength of $\lambda$ in this case is expressed by the following equation.

$$R(\lambda)=0.25\ (1-\cos\ (\delta(\lambda))) \tag{12}$$

When a composite value of a retardation of the liquid crystal layer and that of the phase plate is set to $\Delta nd_{to}(\lambda)$, $\delta(\lambda)$ is expressed by the following equation.

$$\delta(\lambda)=2\pi\times2\Delta nd_{to}(\lambda)/\lambda \tag{13}$$

Figure 20:
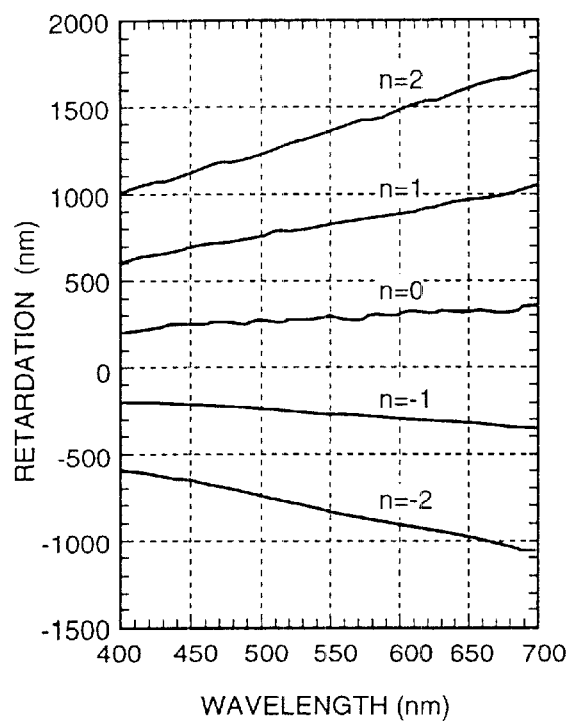
FIG. 20 is a characteristics diagram showing some examples of wavelength dispersion of retardations reducing reflectance of the projection-type liquid crystal display of the invention for the whole visible wavelength range.
Figure 21:
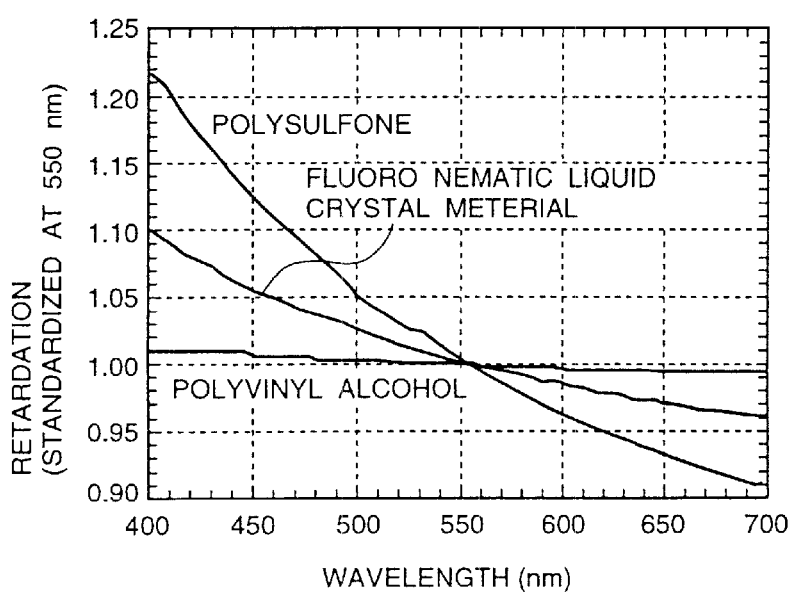
FIG. 21 is a characteristics diagram showing retardation wavelength dispersion of each of the phase plates and a single liquid crystal layer.

In equation 13, the "2" before $\Delta nd_{to}(\lambda)$ denotes that the light is reflected by the reflection plate and passes the phase plate and the liquid crystal layer twice. In order to obtain a high contrast when R($\lambda$)=0, the following equation has to be satisfied for the whole visible wavelength range.

$$\Delta nd_{to}(\lambda)=0.5n\ \lambda \tag{14}$$

where, n is an integer. When equation 14 is plotted with respect to cases where n=−2, −1, 0, 1, and 2, the equation 14 shows a linear line, as shown in FIG. 20, in the cases where n is any one of them. When n≧0, (n) monotonously increases with the wavelength. In case of n<0, it monotonously decreases with the wavelength. On the contrary, the retardations of the phase plate and the liquid crystal layer are quite different from those in FIG. 20 and downwardly convexed curves as shown in FIG. 21, and monotonously decrease with the wavelength.

The case of n=0 is taken as an example, where an attempt is made to bring $\Delta nd_{to}(\lambda)$ close to the equation 14 over the whole visible wavelength range by optimizing the retardations of the phase plate and the liquid crystal layer and the laminating method. Equation 15 shows $\Delta nd_{to}(\lambda)$ of the liquid crystal layer and one phase plate and equation 16 shows $\Delta nd_{to}(\lambda)$ of the liquid crystal layer and two phase plates.

$$\Delta nd_{to}(\lambda)=\Delta nd_{LC}(\lambda)\pm\Delta nd_{PH}(\lambda) \tag{15}$$

$$\Delta nd_{to}(\lambda)=\Delta nd_{LC}(\lambda)\pm\Delta nd_{PH1}(\lambda)\pm\Delta nd_{PH2}(\lambda) \tag{16}$$

Figure 22:
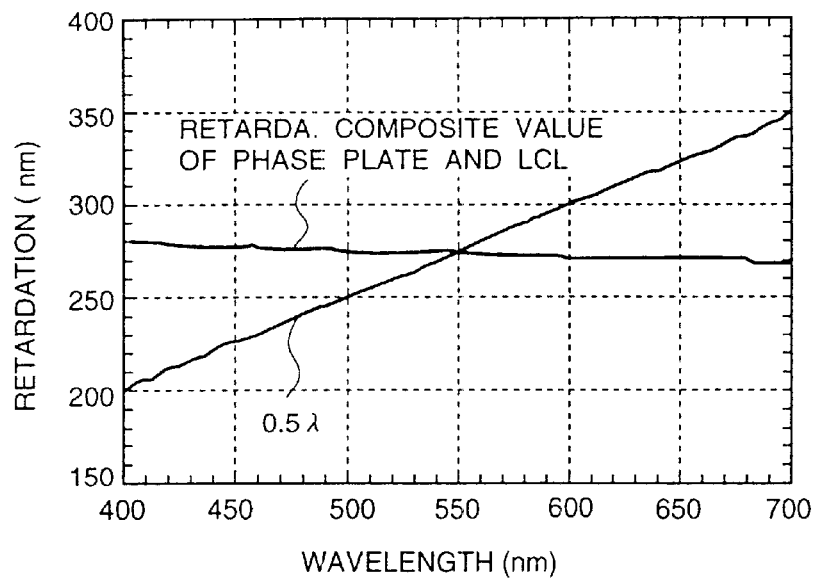
FIG. 22 is a characteristics diagram showing an example of retardation wavelength dispersion obtained by synthesizing retardations of one phase plate and the liquid crystal layer.
Figure 23:
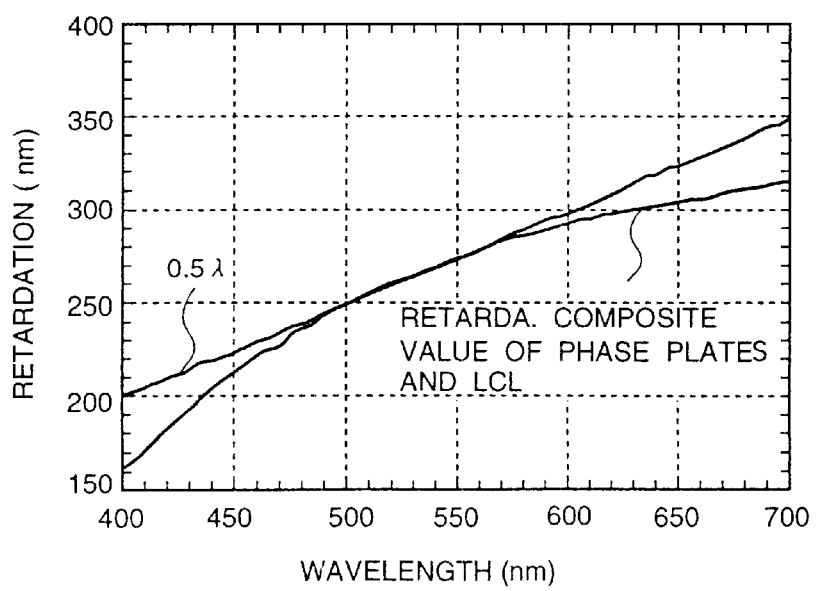
FIG. 23 is a characteristics diagram showing an example of retardation wavelength dispersion obtained by synthesizing retardations of two phase plates and the liquid crystal layer.

$\Delta nd_{LC}(\lambda)$ denotes the retardation of the liquid crystal layer. $\Delta nd_{PH}(\lambda)$, $\Delta nd_{PH1}(\lambda)$, and $\Delta nd_{PH2}(\lambda)$ are retardations of the phase plates. The double signs in equations 15 and 16 are not sequential. When the delay axis of the phase plate is in parallel with the orientation direction of the liquid crystal, the sign is +. When the delay axis perpendicularly crosses the orientation direction, the sign is −. An example of $\Delta nd_{to}(\lambda)$ of the liquid crystal layer and one phase plate is shown in FIG. 22. $\Delta nd_{LC}(\lambda)$ and $\Delta nd_{PH}(\lambda)$ are determined so that $\Delta nd_{to}(\lambda)$ coincides with the equation 14 at the wavelength 550 nm. Although a retardation which monotonously increases with the wavelength is obtained, it becomes close to the equation 14 only around the wavelength of 550 nm. An example of $\Delta nd_{to}(\lambda)$ of the liquid crystal layer and one phase layer is shown in FIG. 23. Although it becomes an extremely close line which coincides at the wavelength 550 nm, it becomes close to the equation 14 only around the wavelength of 550 nm.

Figure 24:
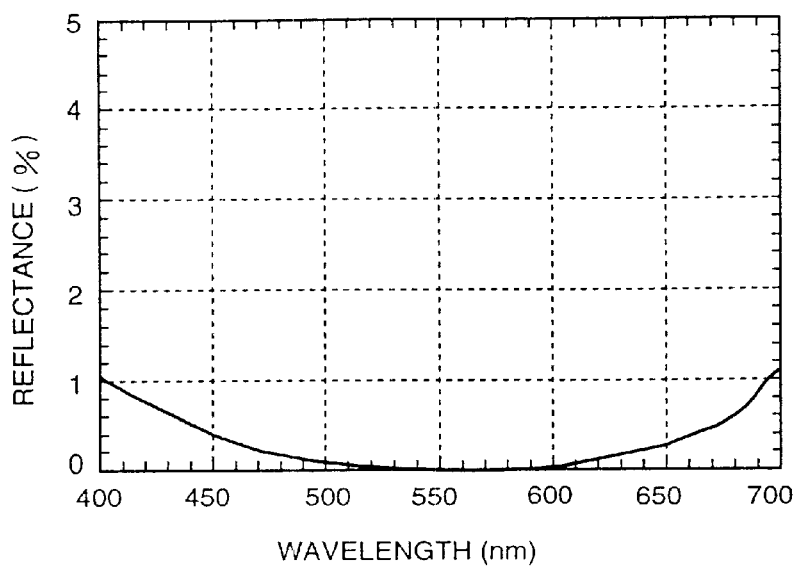
FIG. 24 is a characteristics diagram showing a reflection spectrum of black display of a conventional projection-type liquid crystal display.

A reflection spectrum of the dark display obtained by the retardation wavelength dispersion of the equation 16 is shown in FIG. 24. Although the reflectance is sufficiently reduced around the wavelength 550 nm at which the retardation composite value is close to equation 14, the reflectance is not sufficiently reduced except for the above. Therefore, high contrast cannot be obtained. Since the reflection spectrum of the black display is not flat, black is colored in the display. Since the display colors continuously change on color coordinates, a gray display near a black display is also colored. The retardation wavelength dispersion of each of the phase plate and the single polarizing plate always shows a downwardly convexed curve. Consequently, even when the number of phase plates is increased to three or more, the retardation wavelength dispersion always shows an upwardly convexed curve and the result is the same as the case of two phase plates. As mentioned above, the low contrast and color display of the conventional projection-type liquid crystal display occur because the retardation wavelength dispersion necessary for the dark display cannot be principally realized for the whole visible region.

Figure 19:
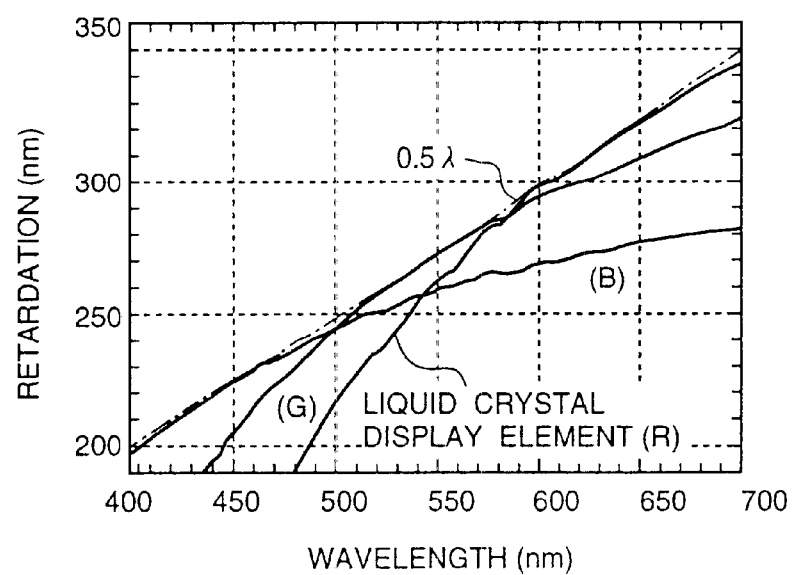
FIG. 19 is a characteristics diagram showing retardation wavelength dispersion for each of three liquid crystal display elements in a projection-type liquid crystal display of the invention.
Figure 25:
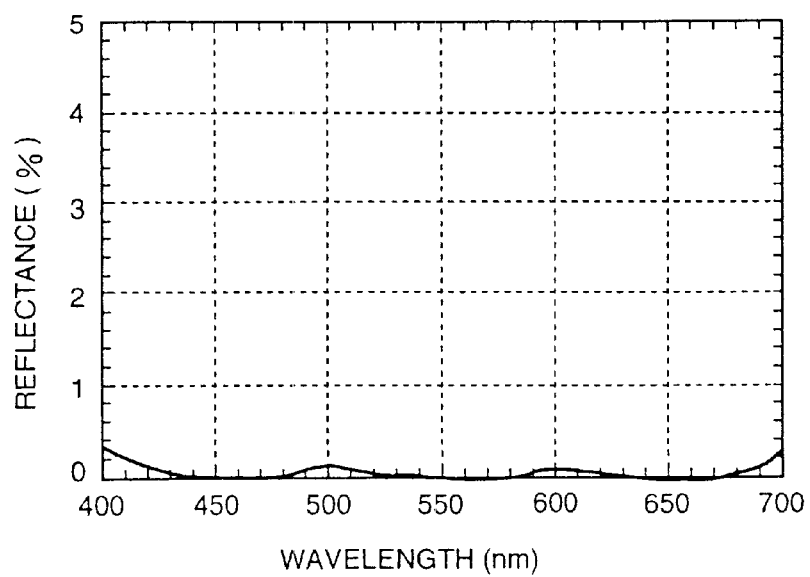
FIG. 25 is a characteristics diagram showing a reflection spectrum of black display of the projection-type liquid crystal display of the invention.

Consequently, R, G, B colors are displayed by different liquid crystal display elements and they are optically added, thereby obtaining a color display. Wavelength ranges of lights transmitting the liquid crystal display elements are different. The width of the wavelength range is narrowed to about ⅓ of the whole visible wavelength range. Therefore, retardations of the phase plates of the liquid crystal display elements are set to be different values so that equation 14 is satisfied at the central wavelength of each color. A composite value of the retardations at this time is an overlap of three retardations of different wavelengths (wavelengths of R, G, and B colors) as shown in FIG. 19, which are close to $0.5\lambda$. Since the reflectance of the black display is reduced for the whole visible wavelength, a high contrast can be obtained. The reflectance spectrum obtained at this time is almost flat for the whole visible wavelength range since the retardations of the three wavelengths which are close to $0.5\lambda$ become minimum as shown in FIG. 25. The black display is consequently made colorless and a gray display near the black display is also made almost colorless.

The projection type liquid crystal display according to various embodiments of the invention will be described more in detail and specifically with reference to the accompanying drawings.

EMBODIMENT 10

Figure 26:
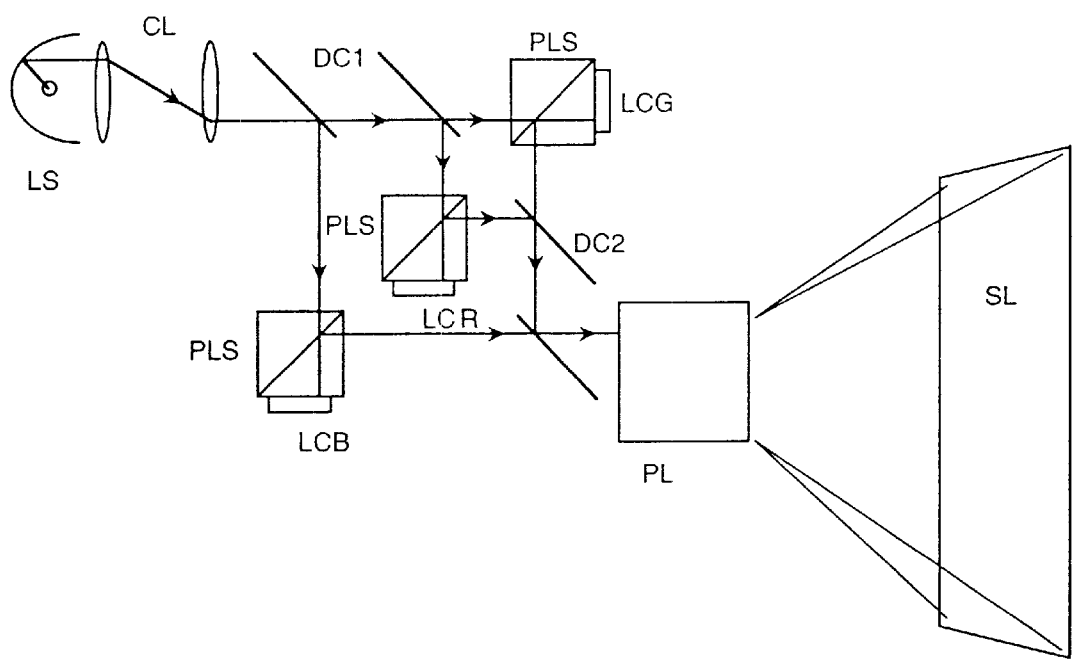
FIG. 26 is a diagram illustrating an arrangement of a light source, an optical system, and liquid crystal display elements of the projection-type liquid crystal display of the invention.

Arrangement of a light source, an optical system, and liquid crystal display elements in the projection-type liquid crystal display of the invention are shown in FIG. 26. A light source LS is a metal halide lamp for projecting a light source light on a dichroic mirror DC 1 by using a group CL of condenser lenses. The light source light is dispersed by the dichroic mirror DC into the three colors of R, G, and B which are directed to different liquid crystal display elements LCR, LCG, and LCB via a respective polarization beam splitter PLS. The wavelength ranges of the lights entering the liquid crystal display elements LCR, LCG, and LCB are from 600 nm to 700 nm, from 500 nm to 600 nm, and from 400 nm to 500 nm, respectively. The reflection lights of the liquid crystal display elements LCR, LCG, and LCB are synthesized by the dichroic mirror DC 2, thereby producing the color display. The color display is projected onto a screen SL using the group PL of projection lenses.

Figure 27:
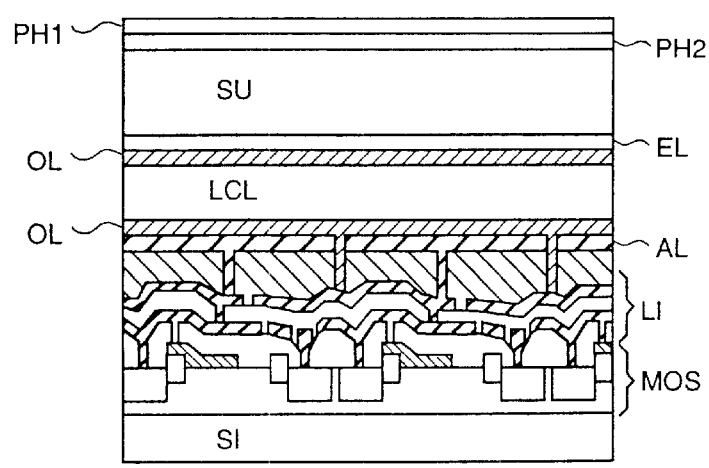
FIG. 27 is a cross section of a liquid crystal display element used for the projection-type liquid crystal display of the invention.

The constructions of the liquid crystal display elements LCR, LCG, and LCB are the same except for phase plates 1 and 2 which will be described later. A cross section of the liquid crystal display element is shown in FIG. 27. A pixel is constructed by a pixel electrode AL, which also serves as a reflection plate. The pixel electrode AL is connected to a wiring layer LI and an MOS by through holes. An orientation film OL is formed on the pixel electrode AL. An upper substrate has a transparent electrode LI and the orientation film OL. The phase plate 1 and the phase plate 2 are laminated on the upper substrate.

A fluoro nematic liquid crystal material is used for a liquid crystal layer. The double refraction at 20° C. is 0.083. The thickness of the liquid crystal layer is 2.4 μm. A retardation of the liquid crystal layer when no voltage is applied is set to 200 nm. The orientation of the liquid crystal layer is set as a homogeneous orientation and pre-tilt angle is set to 4°.

A phase plate made of polyvinyl alcohol and a phase plate made of polysulfone are used for the phase plate 1 and the phase plate 2, respectively. FIG. 21 shows wavelength dispersion of each of the retardations of the polyvinyl alcohol phase plate, polysulfone phase plate, and liquid crystal material fluoro nematic liquid crystal material. The axis of ordinates of FIG. 21 shows retardations standardized by a value of wavelength 550 nm. All of them show downwardly convexed curves which monotonously decrease as the wavelength increases.

Retardations of the phase plates 1 and 2 laminated on each of the LCR, LCG, and LCB are determined as shown below. First, the wavelength 650 nm is set as a reference in the LCR. The wavelength 550 nm is set as a reference in the LCG. The wavelength 450 nm is set as a reference in the LCB. Each of those wavelengths is the central wavelength of the wavelength range of the light entering each liquid crystal display element. The voltage at the time of the dark display is set to 3V. The retardation of the liquid crystal layer when 3V is applied is 38 nm in the LCR, 40 nm in the LCG, and 42 nm in the LCB.

With respect to the LCR, the retardations of the phase plates 1 and 2 are determined so that equation 17 becomes a minimum.

$$\Sigma(0.5\lambda - \Delta nd_{to}(\lambda))^2 \tag{17}$$

$$\Delta nd_{to}(\lambda) = \Delta nd_{LC}(\lambda) \pm R_{PH1}\Delta ndR_{PH1'}(\lambda) \pm R_{PH2}\Delta ndR_{PH2'}(\lambda) \tag{18}$$

$0.5\lambda$ in equation 17 is one of the conditions to obtain the dark display and corresponds to a case where n=1 in equation 14. $R_{PH1}$ and $R_{PH2}$ in equation 18 are retardations of the phase plates 1 and 2, which are to be obtained. $\Delta nd_{PH1}'(\lambda)$, $\Delta nd_{PH2}'(\lambda)$ are retardations of the phase plates 1 and 2, which are standardized by the wavelength of 650 nm.

$\Delta nd_{LC}(\lambda)$ is a retardation of the liquid crystal layer in the wavelength and is equal to 38 nm on the wavelength 650 nm as mentioned above. Equation 17 obtains the sum of values on the wavelengths 600 nm, 610 nm, 620 nm, 630 nm, 640 nm, 650 nm, 660 nm, 670 nm, 680 nm, 690 nm, and 700 nm. As a result, $R_{PH1}$=1233 nm and RPH2=−946 nm are obtained.

Since the sign of $R_{PH1}$ is positive, the phase plate 1 is laminated so that the delay axis is in parallel with the liquid crystal orientation direction. Since the sign of $R_{PH2}$ is negative, the phase plate 2 is laminated so that the delay axis perpendicularly crosses the liquid crystal orientation direction.

Similarly, the retardations of the phase plates 1 and 2 to be laminated on each of the LCG and LCS are determined. In the LCG, $\Delta nd_{PH1}'(\lambda)$ and $\Delta nd_{PH2}'(\lambda)$ are set to retardations standardized by the wavelength 550 nm. Equation 17 obtains the sum of values on the wavelengths 500 nm, 510 nm, 520 nm, 530 nm, 540 nm, 550 nm, 560 nm, 570 nm, 580 nm, 590 nm, and 600 nm. As a result, $R_{PH1}$=862 nm and $R_{PH2}$=−627 nm are obtained. In the LCB, $\Delta nd_{PH1}'(\lambda)$ and $\Delta nd_{PH2}'(\lambda)$ are set to retardations standardized by the wavelength 450 nm. The expression 6 obtains the sum of values on the wavelengths 400 nm, 410 nm, 420 nm, 430 nm, 440 nm, 450 nm, 460 nm, 470 nm, 480 nm, 490 nm, and 500 nm. As a result, $R_{PH1}$=554 nm and $R_{PH2}$=−371 nm are obtained.

Since the signs of the $R_{PH1}'$ and $R_{PH2}$ of the LCG and LCB are equal to those of the LCR, the method of laminating the phase plates 1 and 2 on each of the LCG and LCB is set to the same as that of the LCR.

Figure 28:
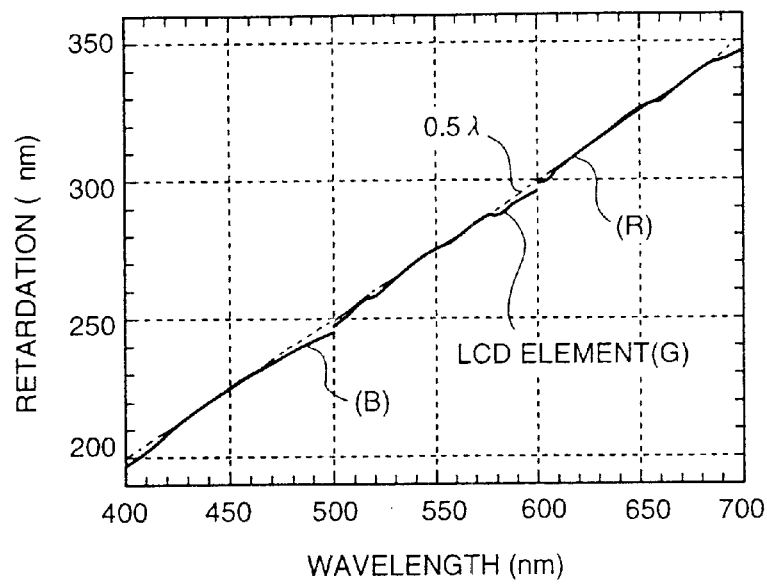
FIG. 28 is a characteristics diagram showing retardation composite values at the time of the dark display of a projection-type liquid crystal display of the embodiment 1.
Figure 29:
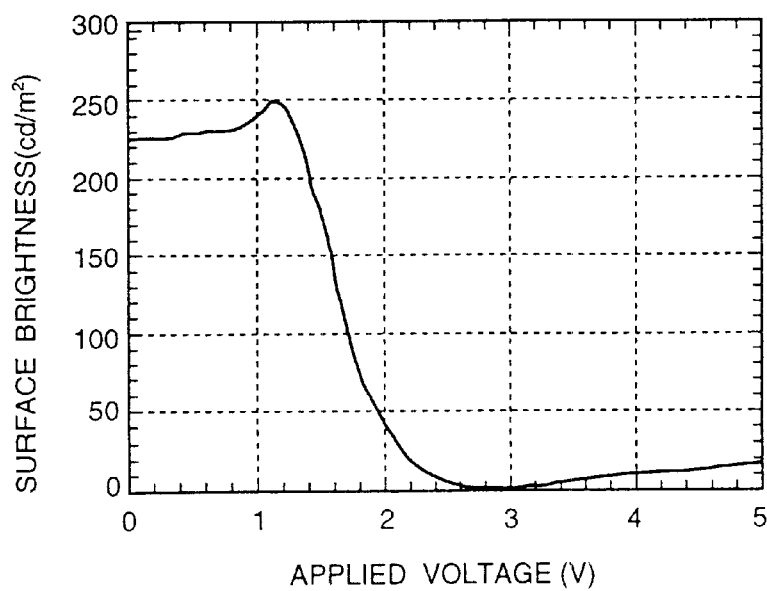
FIG. 29 is a characteristics diagram showing applied voltage dependency of surface brightness of the projection-type liquid crystal display of the embodiment 1.
Figure 30:
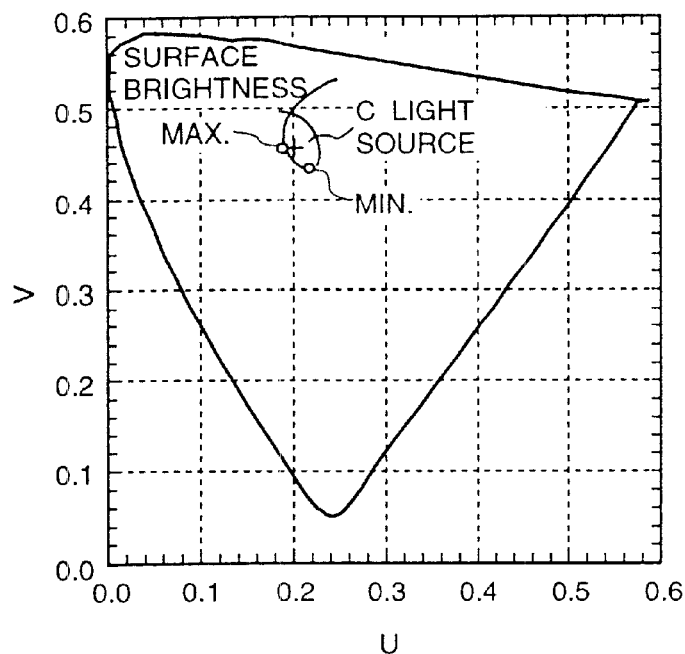
FIG. 30 is a characteristics diagram showing applied voltage dependency of hue of the projection-type liquid crystal display of the embodiment 1.

FIG. 28 shows a retardation composite value of the liquid crystal layer, phase plate 1, and phase plate 2 at the time of the dark display (when 3V is applied) of the LCR, LCG, and LCB. The lights of the wavelength ranges from 600 nm to 700 nm, from 500 nm to 600 nm, and from 400 nm to 500 nm mainly enter the LCR, LCG, and LCB, respectively. Therefore, in FIG. 28, values of the LCR are shown in the wavelength range from 600 nm to 700 nm, values of the LCG are shown in the wavelength range from 500 nm to 600 nm, and values of the LCB are shown in the wavelength range from 400 nm to 500 nm. Since the retardation composite value is brought close to $0.5\lambda$ by the three wavelengths (650 nm, 550 nm, and 450 nm), it is close to $0.5\lambda$ in a wavelength range from 400 nm to 700 nm. The LCR, LCG, and LCB formed as mentioned above are assembled in the projection-type display and display characteristics were evaluated. The measurement was performed in a dark room in order to eliminate the influence by external lights. The same voltage was applied to the LCR, LCG, and LCB, the display was projected onto a screen which is 2 m away, and the brightness and hue were measured. Applied voltage dependency of the screen brightness is shown in FIG. 29. The minimum value 1.9 cd/m² was obtained at the applied voltage of 3.0V and the maximum value 250 cd/m² was obtained at the applied voltage of 1.2V. The contrast ratio was 130:1. FIG. 30 shows that the applied voltage dependency of the hue is plotted to the UCS color coordinate system. The hue of the display is distributed near a C light source between the maximum and minimum values of the screen brightness and colors are almost achromatic. Even in a most colored case, the distance from the C light source is 0.03.

As mentioned above, by setting the different retardations of the phase plates of the three liquid crystal display elements to different values in accordance with the wavelengths of the lights entering, an achromatic display having a high contrast was realized.

EMBODIMENT 11

In the projection-type liquid crystal display of the embodiment 10, the retardations of the phase plates are newly set by setting the voltage at the time of the dark display to 1V.

The retardations of the liquid crystal layer when 1V is applied is 189 nm in the LCR, 195 nm in the LCG, and 205 nm in the LCB. $\Delta nd_{LC}(\lambda)$ in equation 17 is set to 189 nm at the wavelength 650 nm and $\Delta nd_{PH1}'(\lambda)$ and $\Delta nd_{PH}'(\lambda)$ are set to retardations standardized by the wavelength 650 nm, thereby obtaining $R_{PH1}$ and $R_{PH2}$ of the LCR. Similarly, the retardations of the phase plates 1 and 2 laminated on each of the LCG and LCB are determined. As a result, $R_{PH1}$=1137 nm and $R_{PH2}$=−996 nm in the LCR. $R_{PH1}$=776 nm and $R_{PH2}$=−691 nm in the LCG. $R_{PH1}$=465 nm and $R_{PH2}$=−440 nm in the LCB.

The LCR, LCG, and LCB formed as mentioned above are assembled in the projection-type display and the display characteristics were evaluated. The minimum value 2.1 cd/m² was obtained at the applied voltage 1.0V and the maximum value 255 cd/m2 was derived at the applied voltage 2.3V. The contrast ratio was 121:1. The hue of the display was distributed near the C light source between the maximum and minimum values of the screen brightness and colors were almost achromatic. Even in the most colored case, the distance from the C light source was 0.03.

As mentioned above, by setting the retardations of the phase plates of the three liquid crystal display elements to different values in accordance with the wavelengths of the lights entering, an achromatic display having a high contrast can be realized.

EMBODIMENT 12

In the projection-type display of the embodiment 10, the retardations of the phase plates 1 and 2 are obtained by changing equation 17 to the following expression.

$$\Sigma(-0.5\lambda - \Delta nd_{to}(\lambda))^2 \qquad (19)$$

$-0.5\lambda$ in the expression 8 corresponds to a case where n=−1 in equation 19. $R_{PH1}$=−1283 nm and $R_{PH2}$=920 nm in the LCR. $R_{PH1}$=−908 nm and $R_{PH2}$32 593 nm in the LCG. $R_{PH1}$=−601 nm and $R_{PH2}$=334 nm in the LCB The sign of $R_{PH1}$ is negative and the sign of $R_{PH2}$ is positive in any of the LCR, LCG, and LCB. Therefore, the phase plate 1 is laminated so that the delay axis perpendicularly crosses the liquid crystal orientation direction and the phase plate 2 is laminated so that the delay axis is in parallel with the liquid crystal orientation direction in each of the LCR, LCG, and LCB.

The LCR, LCG, and LCB formed as mentioned above are assembled in the projection-type display and the display characteristics were evaluated. The minimum value 2.0 cd/m² was obtained at the applied voltage 3.0V and the maximum value 249 cd/m² was derived at the applied voltage 1.3V. The contrast ratio was 125:1. The hue of the display is distributed near the C light source between the maximum and minimum values of the screen brightness and colors are almost achromatic. Even in the most colored case, the distance from the C light source was 0.03.

As mentioned above, by setting the retardations of the phase plates of the three liquid crystal display elements to different values, respectively, in accordance with the wavelengths of the lights entering, an achromic display having a high contract can be realized.

Example for Comparison

In the projection-type display of the embodiment 10, the retardations of the phase plates 1 and 2 of each of the LCR and LCB are set to be equal to those of the LCG. That is, the retardations of the phase plates in all of the liquid crystal display elements used for the projection-type display are set to be equal.

Figure 33:
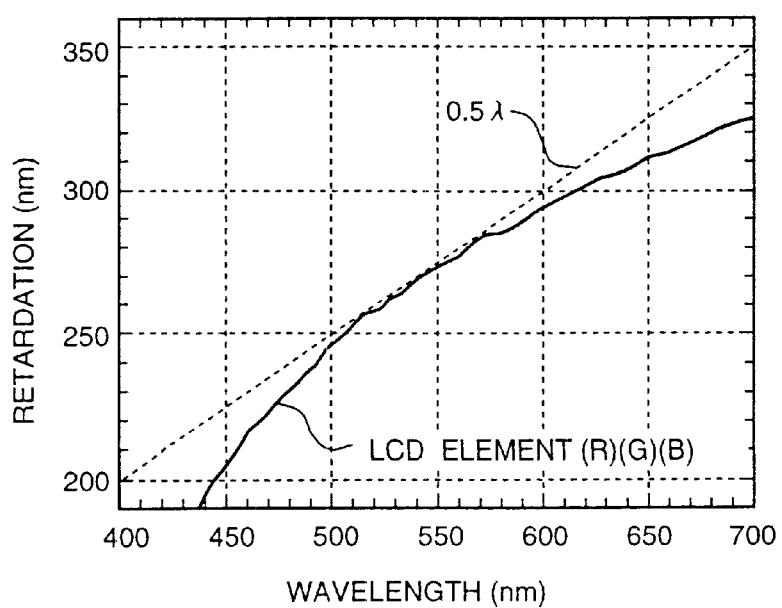
FIG. 33 is a characteristics diagram showing retardation composite values at the time of the dark display of the projection-type liquid crystal display of the comparison example 1.

FIG. 33 shows composite values at the time of the dark display. Although the composite values are close to $0.5\lambda$ near the wavelength 550 nm, they are largely apart from $0.5\lambda$ on both ends of the visible wavelength range.

Figure 31:
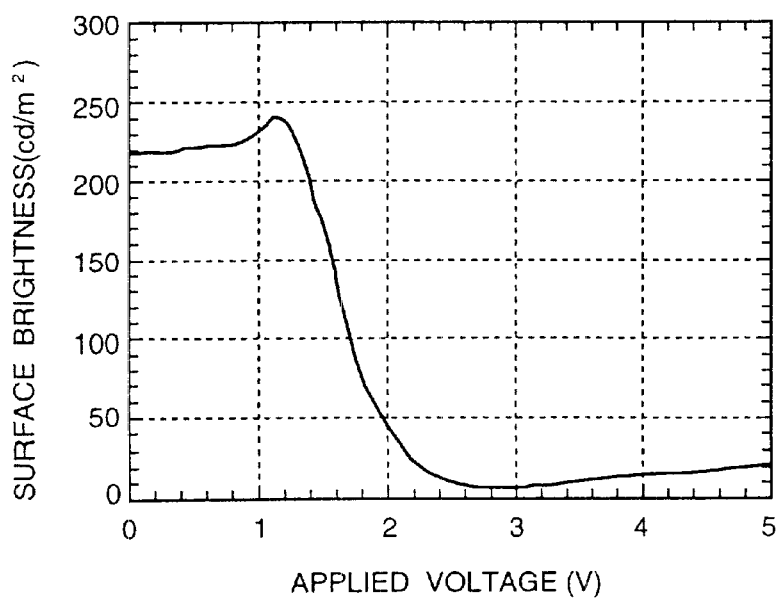
FIG. 31 is a characteristics diagram showing applied voltage dependency of surface brightness of a projection-type liquid crystal display of a comparison example 1.
Figure 32:
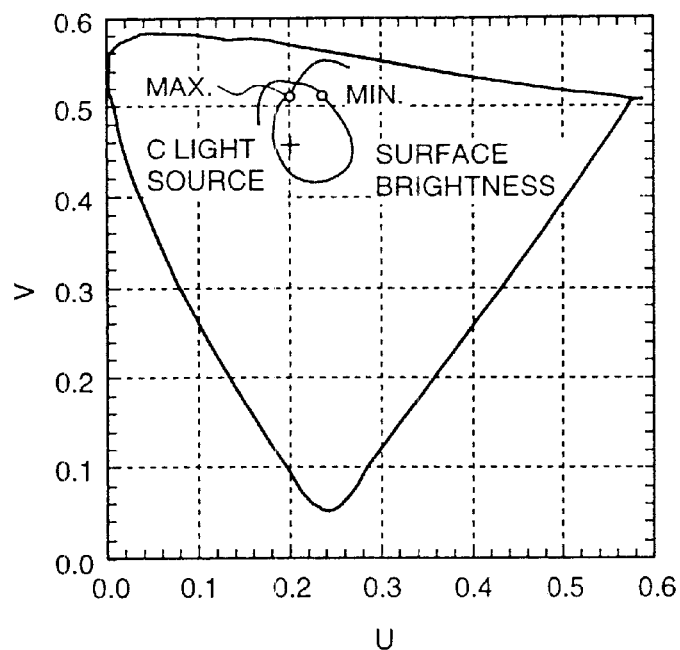
FIG. 32 is a characteristics diagram showing applied voltage dependency of hue of the projection-type liquid crystal display of the comparison example 1.

FIG. 31 shows the applied voltage dependency of the screen brightness. The minimum value 5.2 cd/m² was obtained at the applied voltage 3.0v and the maximum value 240 cd/m² was derived at the applied voltage 1.2V. The contrast ratio was 46:1. FIG. 32 shows that the applied voltage dependency of the hue is plotted to the UCS color coordinate system. Although the hue of the display approaches the C light source once between the maximum and minimum values of the screen brightness, it is largely apart at the minimum value. The distance from the C light source at the minimum value of the reflectance is 0.08 and gray at the time of the dark display and on the low luminance side is colored as purple.

As mentioned above, if the retardations of the phase plates of the three liquid crystal display elements are set to the same value without considering the wavelengths of the entering lights, the composite value of the retardations is not adapted to the condition of equation 14 except at one point in the visible wavelength range. Therefore, the light is transmitted on both sides of the visible wavelength range even at the time of dark display and the dark display is colored as purple. As a result, the contrast ratio deteriorates and gray at the time of the dark display and on the low luminance side is colored.

According to the embodiments of the invention as described above, a projection-type liquid crystal display which can display in achromatic colors with a high contrast can be obtained. Although the layer construction of the liquid crystal layer was described as having a homogeneous orientation, the invention is not limited to such an orientation. Even if a layer construction having a torsion is used, by determining the delay axis of the phase plate and the transmission axis of the polarizing plate by using the orientation direction of the liquid crystal adjacent to the polarizing plate as a reference, similar effects also can be obtained. The phase plate and the polarizing plate are not limited to the use of organic high polymer films. By using phase and polarizing plates made of an inorganic material, similar effects also can be obtained.

What is claimed is:

1. A liquid crystal display in which a polarizing plate, first and second phase plates, an upper substrate, a liquid crystal layer, a drive device, and a lower substrate also serving as a reflection plate are sequentially laminated in a travelling direction of transmitted light, and an absorption axis direction of the polarizing plate and an alignment direction of the liquid crystal layer, which is on the side adjacent to the polarizing plate have a non-parallel relation, wherein each of the first and second phase plates has a wavelength dispersion of a retardation such that a wavelength dispersion of a retardation composite value of the first and second phase plates and the liquid crystal layer is substantially approximated to a retardation curve expressed by a relational expression of one of $(0.25+0.5n)\lambda$ and $(0.5n)\lambda$ in a range of wavelengths from 400 nm to 700 nm of said transmitted light, where n is an integer and $\lambda$ is a wavelength (nm) of the transmitted light.

2. A liquid crystal display in which a polarizing means, first and second phase plates, an upper substrate, a liquid crystal layer, a drive device, and a lower substrate also serving as a reflection plate are sequentially laminated in a travelling direction of transmitted light, and an absorption axis direction of the polarizing means and an alignment direction of the liquid crystal layer, which is on the side adjacent to the polarizing means, have a non-parallel relation, wherein the polarizing means is a polarizing plate of a type in which a vibration direction of a transmission polarization component of the polarizing means rotates by 90° when a passing direction of the transmission light is changed, and each of the first and second phase plates has a wavelength dispersion of a retardation, such that a wavelength dispersion of a retardation composite value of the first and second phase plates and the liquid crystal layer is set so as to be substantially approximated to a retardation curve expressed by a relational expression of $(0.5n)\lambda$ in a range of wavelengths from 400 nm to 700 nm of said transmitted light, where n is an integer and $\lambda$ is a wavelength (nm) of the transmitted light.

3. A liquid crystal display according to claim 2, characterized in that n is 1 or larger, and wherein:

a gradient of the wavelength dispersion of the retardation of the first phase plate is steeper than that of the liquid crystal layer and a gradient of the wavelength dispersion of the retardation of the second phase plate is flatter than that of the liquid crystal layer, the first phase plate is arranged so that a delay axis of the first phase plate perpendicularly crosses the alignment direction of the liquid crystal layer, and the second phase plate is arranged so that a delay axis of the second phase plate is in parallel with the alignment direction of the liquid crystal layer, and retardation at the wavelength 550 (nm) of the second phase plate is larger than a retardation at the wavelength 550 (nm) of the first phase plate.

4. A liquid crystal display according to claim 2, characterized in that n is equal to 0, and wherein:

a gradient of the wavelength dispersion of the retardation of the first phase plate is steeper than that of the liquid crystal layer and a gradient of the wavelength dispersion of the retardation of the second phase plate is flatter than that of the liquid crystal layer, and the first phase plate and the second phase plate are arranged so that a respective delay axis of each of the first and second phase plates perpendicularly crosses an alignment direction of the liquid crystal layer.

5. A liquid crystal display according to claim 1 or 2, characterized in that n is less than 0, and wherein:

a gradient of the wavelength dispersion of the retardation of the first phase plate is steeper than that of the liquid crystal layer and a gradient of the wavelength dispersion of the retardation of the second phase plate is flatter than that of the liquid crystal layer, the first phase plate is arranged so that the delay axis of the first phase plate is in parallel with an alignment direction of the liquid crystal layer and the second phase plate is arranged so that the delay axis of the second phase plate perpendicularly crosses the alignment direction of the liquid crystal layer, and a retardation at the wavelength 550 (nm) of the second phase plate is larger than a retardation at the wavelength 550 (nm) of the first phase plate.

6. A liquid crystal display according to claim 1, characterized in that the relational expression $(0.25+0.5n)\lambda$ is utilized.

7. A liquid crystal display according to claim 6, characterized in that n is 0 or larger, and wherein:

a gradient of the wavelength dispersion of the retardation of the first phase plate is steeper than that of the liquid crystal layer and a gradient of the wavelength dispersion of the retardation of the second phase plate is flatter than that of the liquid crystal layer, the first phase plate is arranged so that a delay axis of the first phase plate perpendicularly crosses the alignment direction of the liquid crystal layer, and the second phase plate is arranged so that a delay axis of second the phase plate is in parallel with the alignment direction of the liquid crystal layer, and a retardation at the wavelength 550 (nm) of the second phase plate is larger than a retardation at the wavelength 550 (nm) of the first phase plate.

8. A liquid crystal display having a projection optical system in which a polarizing plate, a phase plate arrangement, a liquid crystal layer, and a reflection plate are arranged in parallel and transmitted light is reflected by the reflection plate, wherein the phase plate arrangement comprises first and second phase plates in which a retardation of each of the first and second phase plates and a gradient of wavelength dispersion of the retardation can be freely set, and the gradient of the first phase plate is set so as to be larger than the gradient of the liquid crystal layer and the gradient of the second phase plate is set so as to be smaller than the gradient of the liquid crystal layer, and wavelength dispersion of a retardation composite value in the projection optical system which is provided by a combination of the liquid crystal layer and the first and second phase plates is brought substantially close to a retardation curve expressed by a relational expression of $(0.25+0.5n)\lambda$ where n is an integer and $\lambda$ is a wavelength (nm) of the transmitted light.

9. A projection-type liquid crystal display comprising a drive device, a light source, an optical system, and a plurality of liquid crystal display elements, characterized in that each of the plurality of liquid crystal display elements includes a liquid crystal layer, two substrates, and at least one phase plate, and retardations of the phase plates of the plurality of liquid crystal display elements are different from each other, wherein the two substrates forming each of the plurality of liquid crystal display elements have a display electrode and an alignment layer, the display electrode which is provided on a lower substrate of the two substrates also serving as a reflection plate, the display electrode on the lower substrate being connected to an active element, the two substrates being arranged so as to face each other with the liquid crystal layer sandwiched therebetween, and a delay axis of the phase plate is in parallel with or perpendicularly crosses an adjacent alignment direction of the liquid crystal layer, wherein a composite value of a retardation of the phase plate and a retardation of the liquid crystal layer which form each of the plurality of liquid crystal display elements substantially satisfies the relationship $0.5n\lambda$ (where n is an integer) at least in a range of 100 nm in a visible wavelength range of $\lambda=400$ nm to 700 nm when an arbitrary voltage VB is applied to the liquid crystal layer.

10. A projection-type liquid crystal display according to claim 9, wherein n is positive, two phase plates are provided in a liquid crystal display element, wavelength dispersion of retardation of one phase plate is steeper than that of the liquid crystal layer and a delay axis of the one phase plate is set so as to be in parallel with an adjacent alignment direction of the liquid crystal layer, and the wavelength dispersion of retardation of the other phase plate is flatter than that of the liquid crystal layer and a delay axis of the other phase plate is set so as to perpendicularly cross an adjacent alignment direction of the liquid crystal.

11. A projection-type liquid crystal display according to claim 9, wherein (n) is a negative integer, two phase plates are provided in a liquid crystal display element, the wavelength dispersion of retardation of one of the phase plates is steeper than that of the liquid crystal layer and a delay axis of the one phase plate is set so as to perpendicularly cross an adjacent alignment direction of the liquid crystal, and the wavelength dispersion of retardation of the other phase plate is flatter than that of the liquid crystal layer and a delay axis of the other phase plate is set so as to be in parallel with an adjacent alignment direction of the liquid crystal.

\* \* \* \* \*